(12) United States Patent
O'Neil

(10) Patent No.: US 8,620,773 B1
(45) Date of Patent: Dec. 31, 2013

(54) PRODUCT BUILDING AND DISPLAY SYSTEM

(75) Inventor: Ralph G. O'Neil, Dayton, OH (US)

(73) Assignee: Media Resources Corporation, Dayton, OH (US)

( * ) Notice: Subject to any disclaimer, the term of this patent is extended or adjusted under 35 U.S.C. 154(b) by 1009 days.

(21) Appl. No.: 12/062,435

(22) Filed: Apr. 3, 2008

Related U.S. Application Data

(60) Provisional application No. 60/910,359, filed on Apr. 5, 2007.

(51) Int. Cl.
*G06Q 30/00* (2012.01)

(52) U.S. Cl.
USPC .......................... 705/27.1; 705/26.1; 705/26.4

(58) Field of Classification Search
USPC .......................................... 705/26, 26.1–27.2
See application file for complete search history.

(56) References Cited

U.S. PATENT DOCUMENTS

| | | | |
|---|---|---|---|
| 4,992,940 A | 2/1991 | Dworkin | |
| 5,913,210 A | 6/1999 | Call | |
| 5,970,472 A | 10/1999 | Allsop et al. | |
| 6,014,638 A * | 1/2000 | Burge et al. | 705/10 |
| 6,026,379 A | 2/2000 | Haller et al. | |
| 6,067,525 A | 5/2000 | Johnson et al. | |
| 6,115,641 A | 9/2000 | Brown et al. | |
| 6,249,772 B1 * | 6/2001 | Walker et al. | 705/26.41 |
| 6,260,024 B1 | 7/2001 | Shkedy | |
| 6,263,317 B1 | 7/2001 | Sharp et al. | |
| 6,272,472 B1 | 8/2001 | Danneels et al. | |
| 6,282,517 B1 | 8/2001 | Wolfe et al. | |
| 6,460,072 B1 | 10/2002 | Arnold et al. | |
| 6,728,685 B1 | 4/2004 | Ahluwalia | |
| 6,850,901 B1 | 2/2005 | Hunter et al. | |
| 6,876,980 B2 | 4/2005 | Reid et al. | |
| 6,922,676 B2 | 7/2005 | Alnwick | |
| 7,165,041 B1 | 1/2007 | Guheen et al. | |
| 7,165,174 B1 | 1/2007 | Ginter et al. | |
| 7,168,051 B2 | 1/2007 | Robinson et al. | |
| 7,171,379 B2 | 1/2007 | Menninger et al. | |
| 7,181,419 B1 | 2/2007 | Mesaros | |
| 7,188,080 B1 | 3/2007 | Walker et al. | |
| 2001/0018669 A1 | 8/2001 | Fujiwara | |
| 2001/0034605 A1 * | 10/2001 | Hoffman | 705/1 |
| 2001/0034659 A1 | 10/2001 | Kobayashi | |
| 2001/0034670 A1 | 10/2001 | Blair | |
| 2001/0034694 A1 * | 10/2001 | Elias | 705/37 |
| 2001/0034726 A1 | 10/2001 | McMahon et al. | |
| 2001/0042050 A1 | 11/2001 | Fletcher et al. | |
| 2001/0049657 A1 | 12/2001 | Wang | |

(Continued)

OTHER PUBLICATIONS

Michel, R. (2000). Open for e-business. Manufacturing Systems, 18(1), 36-42.*

*Primary Examiner* — Resha Desai
(74) *Attorney, Agent, or Firm* — Thomas E. Lees, LLC

(57) ABSTRACT

Systems, methods and computer program products provide e-commerce capabilities that enable integration of manufacturers, dealers and customers. An application may be utilized by a dealer to integrate manufacturer and customer information, including cost information, into a coordinated application. The e-commerce application may also be utilized to quickly and efficiently construct customer-specific web-based homepages that custom-tailor the display of information to a customer's needs or perceived needs. Further, the invention provides for the integration of information amongst multiple manufacturers, dealers and customers. The e-commerce application may also be utilized to provide numerous other features and aspects, as set out more fully herein.

20 Claims, 14 Drawing Sheets

(56) References Cited

U.S. PATENT DOCUMENTS

| | | |
|---|---|---|
| 2002/0007318 A1 | 1/2002 | Alnwick |
| 2002/0032626 A1 | 3/2002 | DeWolf et al. |
| 2002/0038264 A1 | 3/2002 | Ishikawa |
| 2002/0052778 A1 | 5/2002 | Murphy et al. |
| 2002/0069110 A1 | 6/2002 | Sonnenberg |
| 2002/0069119 A1* | 6/2002 | Rogatinsky ............... 705/26 |
| 2002/0072983 A1 | 6/2002 | Teller |
| 2002/0072984 A1 | 6/2002 | Rothman et al. |
| 2002/0077761 A1 | 6/2002 | Haraburda et al. |
| 2002/0077944 A1 | 6/2002 | Bly et al. |
| 2002/0080931 A1 | 6/2002 | Yamamoto et al. |
| 2002/0082966 A1 | 6/2002 | O'Brien et al. |
| 2002/0099622 A1 | 7/2002 | Langhammer |
| 2002/0111877 A1 | 8/2002 | Nelson |
| 2002/0123941 A1 | 9/2002 | Donahue et al. |
| 2002/0138360 A1 | 9/2002 | Inoue et al. |
| 2002/0147663 A1 | 10/2002 | Walker et al. |
| 2002/0156707 A1 | 10/2002 | Reid et al. |
| 2002/0165936 A1 | 11/2002 | Alston et al. |
| 2002/0169681 A1 | 11/2002 | Vincent et al. |
| 2002/0184114 A1 | 12/2002 | Jorgensen |
| 2002/0194045 A1 | 12/2002 | Shay et al. |
| 2002/0194047 A1 | 12/2002 | Edinger et al. |
| 2002/0194081 A1* | 12/2002 | Perkowski ............... 705/26 |
| 2002/0198787 A1 | 12/2002 | Yang |
| 2002/0198791 A1 | 12/2002 | Perkowski |
| 2003/0009392 A1 | 1/2003 | Perkowski |
| 2003/0050849 A1 | 3/2003 | Keller et al. |
| 2003/0050867 A1 | 3/2003 | Menninger et al. |
| 2003/0069798 A1 | 4/2003 | Hoffman |
| 2003/0074281 A1 | 4/2003 | Hoffman et al. |
| 2003/0083961 A1* | 5/2003 | Bezos et al. ............... 705/27 |
| 2003/0093321 A1 | 5/2003 | Bodmer et al. |
| 2004/0002893 A1 | 1/2004 | Feher |
| 2004/0002966 A1 | 1/2004 | Perkowski |
| 2004/0059595 A1* | 3/2004 | Hoffmann ............... 705/1 |
| 2004/0133435 A1 | 7/2004 | Berlin et al. |
| 2004/0148394 A1 | 7/2004 | Circenis et al. |
| 2004/0153359 A1 | 8/2004 | Ho et al. |
| 2004/0153372 A1 | 8/2004 | Pilzer |
| 2004/0162828 A1 | 8/2004 | Moyes et al. |
| 2004/0167827 A1 | 8/2004 | Vincent et al. |
| 2004/0177010 A1 | 9/2004 | Francis, Jr. |
| 2004/0199413 A1 | 10/2004 | Hauser et al. |
| 2004/0199575 A1 | 10/2004 | Geller |
| 2005/0086239 A1 | 4/2005 | Swann et al. |
| 2005/0131768 A1 | 6/2005 | Rodriguez et al. |
| 2005/0131769 A1 | 6/2005 | Flynn et al. |
| 2005/0149547 A1 | 7/2005 | Wight et al. |
| 2005/0203762 A1 | 9/2005 | Tebeau et al. |
| 2005/0222912 A1 | 10/2005 | Chambers |
| 2006/0010044 A1 | 1/2006 | Harris |
| 2006/0036511 A1 | 2/2006 | Lin |
| 2006/0041435 A1 | 2/2006 | Knorr |
| 2006/0041443 A1 | 2/2006 | Horvath, Jr. |
| 2006/0041457 A1 | 2/2006 | Mueller et al. |
| 2006/0059055 A1 | 3/2006 | Lin |
| 2006/0095333 A1 | 5/2006 | Gambhir |
| 2006/0100937 A1 | 5/2006 | Lucas |
| 2006/0106633 A1 | 5/2006 | Quintana et al. |
| 2006/0106673 A1 | 5/2006 | Resare |
| 2006/0178973 A1 | 8/2006 | Chiovari et al. |
| 2006/0212365 A1 | 9/2006 | Mori et al. |
| 2006/0282345 A1 | 12/2006 | Nelson |
| 2006/0293971 A1 | 12/2006 | Hunter et al. |
| 2007/0022021 A1 | 1/2007 | Walker et al. |
| 2007/0038522 A1 | 2/2007 | Bell et al. |
| 2007/0061223 A1 | 3/2007 | Rodriguez et al. |
| 2007/0239552 A1* | 10/2007 | Sundaresan ............... 705/26 |

* cited by examiner

TEMPLATE - Size, Description, Tiered: This template type is used primarily for input of items that have size, description and quantity pricing (tiered).

| Product # | Size Length / (Sheets) | Crtn. Qty. | Item Disc.(%) | Dealer Cost | New List/Cost | Current List/Cost | Adj.(+/-) Cost | Dealer Sales Cost | Adj.(+/-) Price | Web Price |
|---|---|---|---|---|---|---|---|---|---|---|
| 364650065 | 50"x100' | 1-3 | 6.66 | 211.33 | 0.00 | 226.42 | 0.00 | 226.42 | 0.00 | 328.31 |
| Active | | 4-9 | 2.67 | 211.33 | 0.00 | 217.13 | 0.00 | 217.13 | 0.00 | 314.84 |
| | | 10+ | 0.00 | 211.33 | 0.00 | 211.33 | 0.00 | 211.33 | 0.00 | 306.43 |

Description: 11.9 mil. Prisma Backlit Easy Tack WF SA 295 Matte, 2" Core.

Add New

Fig. 7

ACTIVE Status product

| | | | |
|---|---|---|---|
| Inkjet | | | View |
|   Cad Media | | | View |
|     Bond | > | 730 731 733(New) 740 | |
|     Recycled Bond | > | | |
|     Coated Color Bond | > | 745 746 747 748 | |
|     Translucent Bond | > | 750 751 | |
|     Vellum | > | 771 772 | |
|     Film | > | 7923D 7924C 7924D | |
|   Graphic & Commercial Photo Media | | | View |
|   Solvent Media | | | View |
|   Engineering | | 3 mil. Double Matte Erasable Inkjet Film, 2" Core Rolls & Cut Sheets. | View |
|   Plotting | | | View |
|   Drafting | | | View |
|   Diazo | | | View |

Fig. 8

Product #: 7923D
Highlight: 3 mil. Double Matte Erasable Inkjet Film, 2" Core Rolls & Cut Sheets.
Description: This product offers an economical way to produce archival documents and tear-proof masters, it also features outstanding formation while drying quickly. It also offers excellent erasability. We carry all the industry standard sizes and packaging configurations.

| Product # | Size/Length (Sheets) | Carton Qty. | Description | Price | |
|---|---|---|---|---|---|
| 7923D24A | 24"x120' | 1 | 3 mil. Double Matte Erasable Inkjet Film, 2" Core. | 124.76 | Add |
| 7923D30A | 30"x120' | 1 | Discontinued, while supplies last, call for availability. | 155.96 | Add |
| 7923D027 | 24"x36" (25) | 1 | 3 mil. Double Matte Erasable Inkjet Film. | 80.68 | Add |

| | Product Discount: (%) | | | **Mfg. Increase: (%) | Min. Sales Margin: (%) | Sales Price Margin: (%) |
|---|---|---|---|---|---|---|
| Sales Display | 0 Add | 0 Actual | 0 | 0 | 0 | 0 |

Fig. 12

(*) Fill in required fields.

*Distributor: Dietzgen

*Manufacturer: Dietzgen

*Product #: 7923D

*Type: Size/Description

*Display Type: Individual

*Status: Active

*Highlight: 3 mil. Double Matte Erasable Inkjet Film, 2" Core Rolls & Cut Sheets.

Description: This product offers an economical way to produce archival documents and tear-proof masters. It also features outstanding formation while drying quickly. It also offers excellent erasability. We carry all the industry standard sizes

| | Product Discount: (%) | | | **Mfg. Increase: (%) | Min. Sales Margin: (%) | Sales Price Margin: (%) |
|---|---|---|---|---|---|---|
| Sales Display | 72 Add | 0 Actual | 72 | 0 | 30 | 70 |

| Product # | Size Length / (Sheets) | Crtn. Qty. | Item Disc.(%) | Dealer Cost | New List/Cost | Current List/Cost | Adj.(+/-) Cost | Dealer Sales Cost | Adj.(+/-) Price | Web Price |
|---|---|---|---|---|---|---|---|---|---|---|
| 7923D24A | 24"x120' | 1 | 0.00 | 73.39 | 0.00 | 262.11 | 0.00 | 73.39 | 0.00 | 124.76 |
| Active | Description: 3 mil. Double Matte Erasable Inkjet Film, 2" Core. | | | | | | | | | |
| 7923D30A | 30"x120' | 1 | 0.00 | 91.74 | 0.00 | 327.64 | 0.00 | 91.74 | 0.00 | 155.96 |
| Active | Description: 3 mil. Double Matte Erasable Inkjet Film, 2" Core. | | | | | | | | | |
| 7923D36A | 36"x120' | 1 | 0.00 | 110.08 | 0.00 | 393.14 | 0.00 | 110.08 | 0.00 | 187.14 |
| Active | Description: 3 mil. Double Matte Erasable Inkjet Film, 2" Core. | | | | | | | | | |
| 7923D027 | 24"x36" (25) | 1 | 0.00 | 47.46 | 0.00 | 169.50 | 0.00 | 47.46 | 0.00 | 80.68 |
| Active | Description: 3 mil. Double Matte Erasable Inkjet Film. | | | | | | | | | |

Add New

Accept Modifications

Fig. 13

All Manufacturers Turned On will display all the manufacturers products jointly

| Paper / Film | Inks / Toners | Eng. Toners | Drafting Aids | Tab 5 | Tab 6 |
|---|---|---|---|---|---|
| Inkjet | | | | View | |
| Engineering | | | | View | |
| Plotting | | | | View | |
| Drafting | | | | View | |
| Diazo | | | | View | |

Fig. 14

All Manufacturers Turned Off will display individual manufacturers products separately

| Paper / Film | Inks / Toners | Eng. Toners | Drafting Aids | Tab 5 | Tab 6 |
|---|---|---|---|---|---|
| Deitzgen | | | | | |
| OSE | | | | | |
| National / Azon | | | | | |
| National Printfast | | | | | |
| Sihl | | | | | |

Fig. 15

Display: ⊙ On ◯ Off
Product #: 7923D
Highlight: 3 mil. Double Matte Erasable Inkjet Film, 2" Core Rolls & Cut Sheets.
Description: This product offers an economical way to produce archival documents and tear-proof masters, it also features outstanding formation while drying quickly. It also offers excellent erasability. We carry all the industry standard sizes and packaging configurations.

| Display P S Off | Product # | Size/Length (Sheets) | Carton Qty. | Description | Price |
|---|---|---|---|---|---|
| ⊙ ◯ ◯ | 7923D24A | 24"x120' | 1 | 3 mil. Double Matte Erasable Inkjet Film, 2" Core. | 238.88 |
| ⊙ ◯ ◯ | 7923D30A | 30"x120' | 1 | 3 mil. Double Matte Erasable Inkjet Film, 2" Core. | 298.60 |
| ◯ ⊙ ◯ | 7923D36A | 36"x120' | 1 | 3 mil. Double Matte Erasable Inkjet Film, 2" Core. | 358.30 |
| ◯ ◯ ⊙ | 7923D027 | 24"x36" (25) | 1 | 3 mil. Double Matte Erasable Inkjet Film. | 154.48 |

[ Accept Changes ]

Fig. 16

Example of the Website Display of the Product Modified in the example above.

| Paper / Film | Inks / Toners | Eng. Toners | Drafting Aids | Tab 5 | Tab 6 |

Inkjet > Cad Media > Film 7923D     3 mil. Double Matte Erasable Inkjet Film, 2" Core Rolls & Cut Sheets.     Hide Description This product offers an economical way to produce archival documents and tear-proof masters, it also features outstanding formation while drying quickly. It also offers excellent erasability. We carry all the industry standard sizes and packaging configurations.

| Product # | Size/Length (Sheets) | Carton Qty | Description | Qty | Price |
|---|---|---|---|---|---|
| 7923D24A | 24"x120' | 1 | 3 mil. Double Matte Erasable Inkjet Film, 2" Core. | 0 | 117.42 |
| 7923D30A | 30"x120' | 1 | 3 mil. Double Matte Erasable Inkjet Film, 2" Core. | 0 | 146.78 |

Click here to hides additional sizes and configurations of this product.

| 7923D027 | 24"x36" (25) | 1 | 3 mil. Double Matte Erasable Inkjet Film. | 0 | 75.94 |

[View Cart]

Fig. 17

LOGO HERE

Profile    Products    Customers    Vendors    Policies    Links    Preview Site    Logoff

[Add New]    Company Name: [Select Company] ▼

| Profile | Home Page | Specials | Notes | Orders |

Fig. 18

| Frequently Ordered Items: |
|---|

| Product # | Size/Length (Sheets) | Carton Qty. | Description | Dealer Cost | Margin | Customer Price | ✓ Display Sort/Delete New |
|---|---|---|---|---|---|---|---|

Add New
Add Misc.

[Accept Modifications]

Fig. 19

| Paper / Film | Inks / Toners | Eng. Toners | Drafting Aids | Tab 5 | Tab 6 |

| | | | |
|---|---|---|---|
| Inkjet | | | View |
|   Cad Media | | | View |
|     Bond | > | 730 731 733(New) 740 | View |
|     Recycled Bond | > | | View |
|     Coated Color Bond | > | 745 746 747 748 | View |
|     Translucent Bond | > | 750 751 | View |
|     Vellum | > | 771 772 | View |
|     Film | > | 7923D 7924C 7924D | View |
|   Graphic & Commercial Photo Media | | | View |
|   Solvent Media | | | View |
| Engineering | | | View |
| Plotting | | | View |
| Drafting | | | View |
| Diazo | | | View |

Product #: 7923D
Highlight: 3 mil. Double Matte Erasable Inkjet Film, 2" Core Rolls & Cut Sheets.
Description: This product offers an economical way to produce archival documents and tear-proof masters, it also features outstanding formation while drying quickly. It also offers excellent erasability. We carry all the industry standard sizes and packaging configurations.

| Product # | Size/Length (Sheets) | Carton Qty. | Description | Price | |
|---|---|---|---|---|---|
| 7923D24A | 24"x120' | 1 | 3 mil. Double Matte Erasable Inkjet Film, 2" Core. | 99.41 | Add |
| 7923D30A | 30"x120' | 1 | 3 mil. Double Matte Erasable Inkjet Film, 2" Core. | 124.26 | Add |
| 7923D36A | 36"x120' | 1 | 3 mil. Double Matte Erasable Inkjet Film, 2" Core. | 149.10 | Add |
| 7923D027 | 24"x36" (25) | 1 | 3 mil. Double Matte Erasable Inkjet Film. | 64.30 | Add |

[ View Selected Items ]

Fig. 20

| Frequently Ordered Items: | | | | | | | |
|---|---|---|---|---|---|---|---|
| Product # | Size/Length (Sheets) | Carton Qty. | Description | Dealer Cost | Margin | Customer Price | ☑ Display Sort/Delete New |
| 7923D36A | 36"x120' | 1 | 3 mil. Double Matte Erasable Inkjet Film, 2" Core. | 85.99 | 31.50 | 113.08 | ☑ ↑↓↕x |
| 7923D027 | 24"x36" (25) | 1 | 3 mil. Double Matte Erasable Inkjet Film. | 37.08 | 27.00 | 47.09 | ☑ ↑↓↕x |
| X20B10D | 24"x36" (25) | 1 | 20# Xerographic Bond. | 18.00 | 40.00 | 25.20 | ☑ ↑↓↕x |

Add New
Add Misc.

[ Accept Modifications ]

Fig. 21

Add Nonspecific Notes To Displayed Customers File:

We have a 10% referral on your next order up to $100 for any new customers you send to us. We appreciate your business.

[ Save Note ]

Fig. 22

Add Nonspecific Notes To Specials Page

[ Save Note ]

Fig. 23

When selecting the note command with a specific customer the following screen will appear for note input for that particular customer.

Add/Delete Customer Note:

Welcome back Jim, I hope you enjoyed your vacatation.

[ Save Note ]

Fig. 24

When the customer logs on to his home page the notes will be displayed as keyed-in from the example above. See the results shown below.

Message to our customers:

We have a 10% referral on your next order up to $100 for any new customers you send to us. We appreciate your business.

Message to you:

Welcome back Jim. I hope you enjoyed your vacation.

| Product # | Size/Length (Sheets) | Carton Qty | Description | Qty | Price |
|---|---|---|---|---|---|
| 7923D24A | 24"x120' | 1 | 3 mil. Double Matte Erasable Inkjet Film, 2" Core. | 0 | 117.42 |
| 7923D30A | 30"x120' | 1 | 3 mil. Double Matte Erasable Inkjet Film, 2" Core. | 0 | 146.78 |

[ Add to Cart ]  or  [ Add to Cart and Checkout ]

Fig. 25

PRODUCT BUILDING AND DISPLAY SYSTEM

CROSS REFERENCE TO RELATED APPLICATION

This application claims the benefit of U.S. Provisional Patent Application Ser. No. 60/910,359 filed Apr. 5, 2007 entitled "PRODUCT BUILDING AND DISPLAY SYSTEM", the disclosure of which is hereby incorporated by reference.

BACKGROUND OF THE INVENTION

The present invention relates to systems, computer-implemented methods and computer program products for product building and display of products in a network environment.

Advancing technologies, including the Internet, are creating opportunities for businesses to enhance their interaction with both business partners and customers. However, leveraging these advancing technologies to realize such opportunities is challenging and often difficult to implement. For example, it is not uncommon for a dealer to want to establish a web page to sell products and provide information to its customers. However, the effort, time and expense involved in designing and implementing an effective e-commerce website is not always a practical option. Moreover, if the dealer does not possess the expertise to create a website, a website developer and/or web master must be hired to perform tasks associated with programming and maintaining the website.

Moreover, dealers may desire to utilize network environments such as the Internet to exchange information with the manufacturers, distributors and other business partners with whom they transact to obtain the products that they sell. However, each entity that does business with the dealer typically has different electronic interface requirements, making electronic transactions with a number of different business partners cumbersome, time consuming and expensive. For example, each manufacturer that transacts with a corresponding dealer may require that dealer to comply with their unique manufacturer's Electronic Data Interchange (EDI) specifications. As further examples, manufacturers may require exchanges of information with dealers over a file transfer protocol (ftp) system, secure website, or via other electronic communications methods.

BRIEF SUMMARY OF THE INVENTION

According to aspects of the present invention, a dealer is provided with software tools that create a website without the need of a web designer or web master. The website may include a custom homepage for one or more customers of the dealer such that the products and display of the homepage are tailored to the corresponding customer. The homepage may also include a history of recent purchases or other statistical or historical information that may be useful to the customer.

The software tools may also allow each dealer to control costs with built in features for configuring products and other items that are sold by the dealer. For example, the software tools allow the dealer to add, modify and maintain listings of products from multiple manufacturers in a concise and structured manner. Moreover, a manufacturer may be a "participating manufacturer" that can electronically communicate and control certain aspects of that manufacturer's data on the associated dealer's system. Alternatively, the dealer may manually enter the product and cost information from "non-participating manufacturers".

According to various aspects of the present invention, the dealer has control over the products they choose to sell. For example, the dealer may use the software tools to toggle on or off, the products to be sold. Moreover, the dealer may combine and display products of different manufacturers. This action may be tied to the website creation aspects of the software tools so that a website may be automatically updated based upon the dealer's selections.

According to still further aspects of the present invention, the dealer may private label, discontinue, archive or assign other status indicators to products. The dealer may also be able to add specific products to each customer's home page, each with their own individual price. As such, each dealer has complete control of what products are displayed for sale and what the dealer wants to sell those products for.

According to various aspects of the present invention, systems, methods and computer program products are provided for implementing an e-commerce dealer application. The dealer application implements a products component utilized to enter and/or manage product information related to products carried by an associated dealer. The dealer application further implements a customer component that is utilized to enter and/or manage information about the customers of the associated dealer and a vendor component that is utilized to enter and/or manage information about the manufacturers associated with the corresponding dealer.

The dealer application further implements an interface component that is configured to enable participating manufacturers that transact with the associated dealer to access the dealer application to communicate product information to the products component of the dealer application. In this regard, the dealer application is configured such that each participating manufacturer has control over predetermined product data attributes included in the communicated product information and the corresponding dealer cannot control the predetermined product attributes from the within the application.

The dealer application further implements a web site builder component that utilizes information stored by the product component, customer component and vendor component to generate a customized homepage for at least one customer having information stored within the customer component such that products and customer pricing offered by the associated dealer on the customer's homepage is customized for the associated customer.

BRIEF DESCRIPTION OF THE SEVERAL VIEWS OF THE DRAWINGS

FIG. 7 illustrates an exemplary template for organizing data according to various aspects of the present invention;

FIG. 8 illustrates several exemplary product categories for facilitate a discussion of status categories according to various aspects of the present invention;

FIG. 9 is an exemplary screen shot of product information according to various aspects of the present invention;

FIG. 10 is a screenshot of an exemplary implementation of block E of FIG. 4 according to various aspects of the present invention;

FIG. 11 illustrates an exemplary screen shot for displaying and editing aspects of the e-commerce application according to various aspects of the present invention;

FIGS. 12-17 illustrate exemplary screen shots of data entry, display and editing of data associated with the e-commerce application according to various aspects of the present invention;

FIGS. 18-25 illustrate several exemplary screen shots associated with building and displaying customer home pages for a dealer's web site according to various aspects of the present invention.

DETAILED DESCRIPTION OF THE INVENTION

According to aspects of the present invention, an electronic commerce ("e-commerce") dealer application is provided that may be utilized by a dealer to integrate manufacturer and customer information, including for example, cost information into a coordinated application. The e-commerce application may also be utilized to quickly and efficiently construct customer-specific web pages that custom-tailor the display of information to a customer's needs or perceived needs. The e-commerce application may also be utilized by participating manufacturers to communicate manufacturer product information and to control certain aspects of the information made available by the dealer. The e-commerce application further provides numerous other features and aspects, as set out more fully herein.

Figure 1:
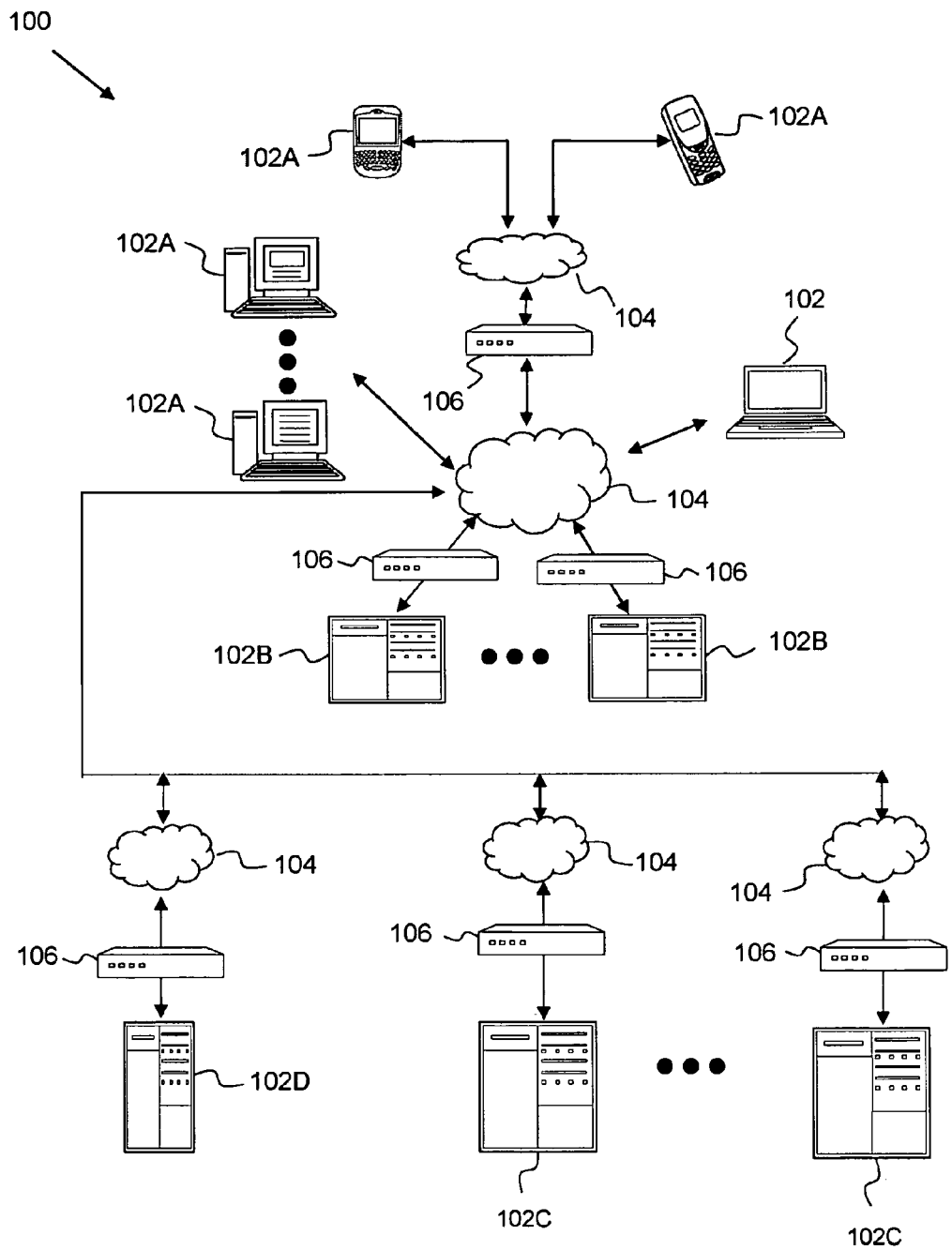
FIG. 1 is a schematic illustration of an exemplary system suitable for implementing a product building application according to various aspects of the present invention.

Referring now to the drawings and particularly to FIG. 1, an exemplary system 100 is illustrated in which an e-commerce system may be implemented according to various aspects of the present invention. As used herein, the term "e-commerce" should be interpreted expansively to include electronic exchanges of information associated with business-related transactions between two or more entities. Thus, e-commerce may involve interaction across a network, such as the Internet using a web browser and corresponding website, using electronic data interchange (EDI), e-mail, electronic bulletin boards, fax transmissions, electronic funds transfer and/or other suitable information exchange techniques alone or in combination. Moreover, the term "business-related" transactions should be interpreted expansively to include transactions between two or more entities that relate to, support or are otherwise associated with business activities of two or more entities, including for example, electronic purchasing, quoting, product returns, accounting functions, inventory functions, product literature and knowledge distribution and other business-related activities.

The system 100 includes a plurality of processing devices, designated generally by the reference numeral 102, that communicate across a network system 104. The processing devices 102 may comprise for example, servers, personal computers, notebook computers, transactional systems, appliance or pervasive computing devices such as personal data assistants (PDA), palm computers, cellular access processing devices, special purpose computing devices and/or other devices capable of interacting with the system 100, and may thus be implemented in hardware, software, or a combination of hardware and software.

The various processing devices 102 may be supported by networking components 106 such as routers, hubs, firewalls, network interfaces, wired or wireless communications links and corresponding interconnections. Moreover, the network system 104 may comprise one or more intranets, extranets, local area networks (LAN), wide area networks (WAN), wireless networks (WIFI), the Internet, including the World Wide Web, and/or other arrangements for enabling communication between the processing devices 102, either real time or otherwise, e.g., via time shifting, batch processing, etc.

In an illustrative example, one or more of the processing devices 102 may be utilized by a customer for conducting e-commerce transactions over the network 104. As such, a processing device 102 utilized by a customer is further designated as 102A. Correspondingly, one or more of the processing devices may be utilized by a dealer that transacts with the customers across the network 104. As such, a processing device utilized by a dealer is further designated as 102B. For example, a select one of the processing devices 102B may comprise a server computer (virtual or physical) that is used to host an on-line business website, where the hosted content or aspects thereof are maintained, controlled, leased, licensed, managed, supervised or otherwise associated with the corresponding dealer.

In an analogous manner, one or more of the processing devices 102 may be utilized by manufacturers that supply products to one or more of the dealers. As such, a processing device 102 utilized by a manufacturer is further designated as 102C. The above is presented by way of illustration and not by way of limitation of the various aspects of the present invention. In practice, there may be other layers of interacting entities, such as various types of providers, wholesalers, distributors, retailers, etc., depending upon the particular application.

According to aspects of the present invention, one or more of the processing devices 102B associated with a corresponding dealer may be utilized to execute a product building and display system that integrates manufacturer and customer information, as will be described in greater detail herein. According to other aspects of the present invention, the system 100 may optionally comprise a trusted service provider 102D that may communicate with the customer processing devices 102A, dealer processing devices 102B and/or manufacturer processing devices 102C to deploy e-commerce services, provide programs, data or other electronic support to implement a product building and display system or portion thereof, as will be described in greater detail herein.

As noted above, aspects of the present invention may be implemented such that each dealer may maintain, operate and/or manage a product building and display application. Under this arrangement, the product building and display application allows the associated dealer to interact with both manufacturers and customers in an integrated processing environment. Moreover, the product building and display application may allow certain participating manufacturers to actively participate and control certain aspects of the data utilized in the integrated processing environment as will be described in greater detail herein. However, the entity, e.g., manufacturer or dealer, that controls specific aspects of the data appears transparent to the customer, who may browse the dealer's website and log into or otherwise gain access to a web homepage that has been customized for that customer as will also be described in greater detail below.

Figure 2:
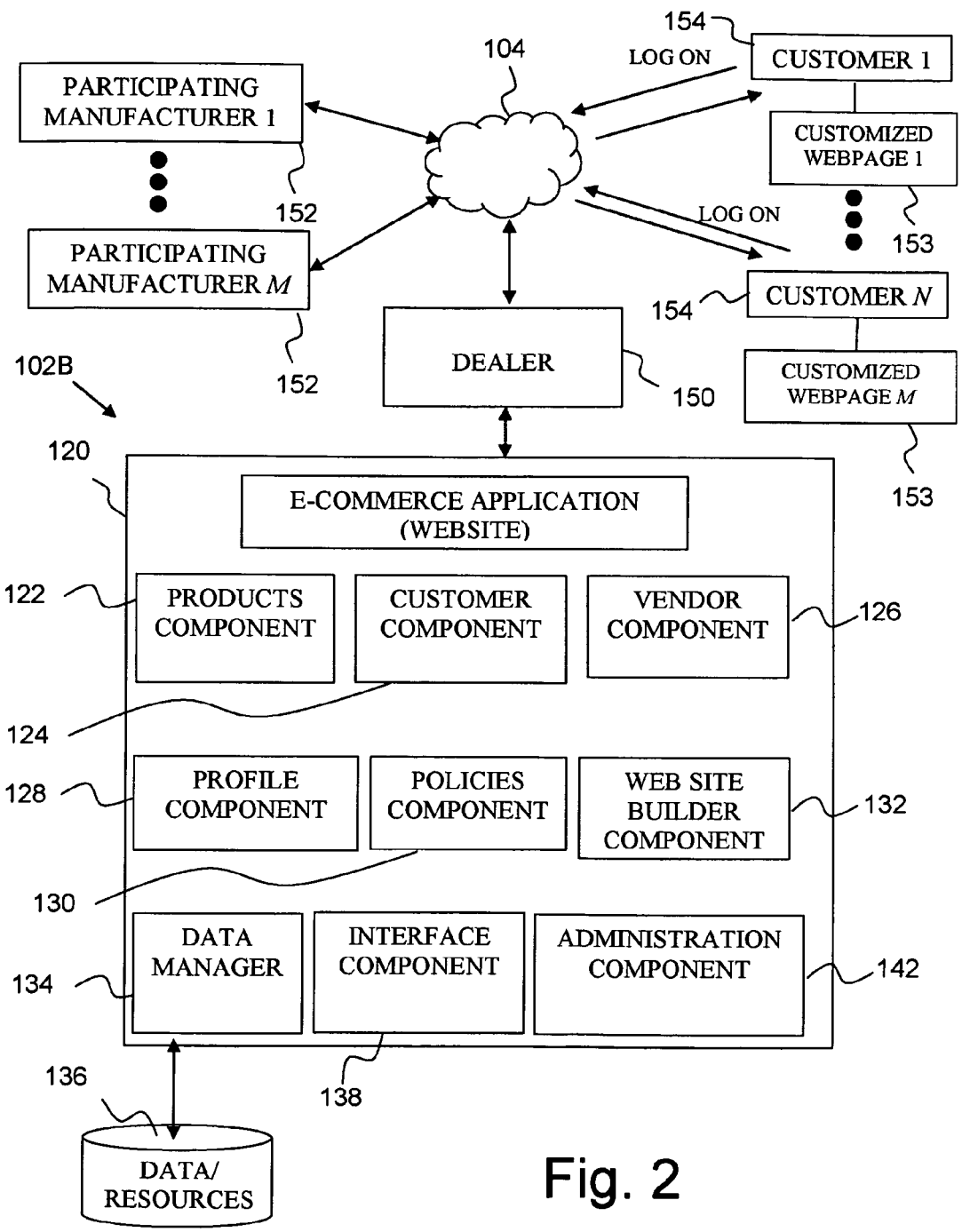
FIG. 2 is a schematic illustration of an single dealer implementation of an e-commerce system according to various aspects of the present invention.

Referring to FIG. 2, according to aspects of the present invention, a dealer processing device 102B hosts an e-commerce based product building and display application. In the exemplary arrangement, the e-commerce application is configured for use by a single dealer. As such, the e-commerce application is referred to herein as a dealer application 120, which is utilized in the dealer's business enterprise to build, create, modify, control and/or maintain aspects of the dealer's website. The application 120 may also be utilized in the generation of customer specific homepages that are controlled by the dealer's website. The application 120 may also be used to maintain data resources related to products sold by the dealer, e.g., by maintaining inventory levels, stock lists, etc. Still further, the application 120 may include hooks or other software capabilities to link into other aspects of the dealer's enterprise, such as by integrating with accounting, warehouse management software, enterprise resource planning software, etc.

The various components of the application 120 may be stored and executed on a single device, such as a server (virtual or physical), which is operated by an Internet service provider or other suitable hosting entity. Alternatively, the dealer may have suitable computer resources within their enterprise to host the application 120. Still further, certain data and/or parts of the application 120 may be distributed, e.g., so that cost or other sensitive information is stored locally by the dealer while the webpage and other related components are maintained by an independent hosting entity. Other arrangements for distributing the various aspects of the present invention may also be implemented, e.g., based upon the requirements of the particular implementation.

As shown, the exemplary application 120 comprises a products component 122 that may be utilized, for example, to enter and/or manage product information, a customer component 124 that may be utilized to enter and/or manage information about the customers of an associated dealer, a vendor component 126 that may be utilized to enter and/or manage information about the manufacturers associated with a dealer, a profile component 128 that may be utilized to enter and/or manage information about the dealer itself, a policies component 130 that may contain rules, policies, checks, validation routines, password and other appropriate authorizations, etc., and a web site builder component 132, which may be utilized to quickly and easily deploy customized websites including specific customer homepages with little or no programming and coding experience required by the dealer.

The application 120 may further comprise a data manager 134 for interacting with data resources 136, such as one or more databases, tables, lists or other suitable data storage formats to manage the various data aspects related to the application 120. Still further, the application 120 may comprise an interface component 138 for interacting with users, such as the dealer, participating manufacturers, etc., as will be described in greater detail herein, and/or an administration component 142, such as for checking the authorizations of users that attempt to utilize the interface component 138 to manipulate the data maintained by the application 120. The administration component 142 may also be utilized for enabling or otherwise facilitating communication, such as with customers via processing devices 102A and/or manufacturers via processing devices 102C, for interacting with trusted service providers 102D, for facilitating messaging as described further herein, etc.

As shown in FIG. 2, the application 120 provides a stand-alone application that may be used by a single dealer 150 to integrate manufacturer information and customer information into a coordinated system. As noted above, depending upon the capability of the dealer 150, the application 120 may alternatively be deployed on a processing device 102D of a trusted third party, e.g., an Internet service provider.

According to various aspects of the present invention, participating manufacturers 152 may directly participate in certain aspects of the implementation of the application 120. As an illustrative example, a participating manufacturer may control the manner in which information is electronically communicated to the corresponding dealer 150. In this regard, a participating manufacturer 152 may utilize its processing device 102C to electronically communicate information that may be privately intended for a selected dealer, such as to communicate information related to cost, availability, dealer incentives, discounts, service instructions or other data related to the interaction and business relationship between the participating manufacturer and the dealer. Moreover, the participating manufacturer may maintain control over certain attributes of information such as product cost, product availability, etc., so that the dealer cannot control, e.g., modify, edit, delete, etc., this data within the application 120.

As another example, the manufacturer 152 may electronically communicate information to the dealer application 120 that may be suitable for passing along from the dealer to the customer, such as data sheets, product descriptions, product support, advertisements, news, notices, announcements or other data such that the dealer 150 does not need to manually enter at least some of the manufacturer's information.

To implement manufacturer integration into the application 120, the participating manufactures may be provided with a software client that interacts with the interface component 138, administration component 142 and corresponding data resources 136 of the application 120 to facilitate updates from the corresponding participating manufacturer. As another example, the manufacturer 152 may be able to log into the application 120 using a suitable browser to exchange information with the application 120, e.g., by supplying suitable log-in credentials that are verified using the vendor component 126, profile component 128, policies component 130, interface component 138 and/or administrative component 142. Thus, as an example, a participating manufacturer may use a web browser to log into the application 120. Once logged in, the participating manufacturer may navigate through menu options within the application to get to a product creation screen. The participating manufacturer may enter product information into the corresponding fields within the product creation aspects of the application. As yet another illustrative example, the participating manufacturer may electronically communicate information that the dealer utilizes to populate the product creation/modification fields, e.g., using a suitable import utility. Other configurations may alternatively be implemented.

Alternatively, one or more manufacturers may not wish to participate by electronically interacting with the application 120. As such, the dealer 150 may manually enter nonparticipating manufacturer information and their corresponding product information into the application 120, e.g., utilizing the products component 122 and/or the vendor component 126 to key in the appropriate information as will be described in greater detail herein.

According to an aspect of the present invention, when the necessary information has been suitably provided to the application 120, the website builder component 132 is utilized to generate a customized web-based homepage 153 for at least one customer 154 of the corresponding dealer 150, e.g., by utilizing information stored by the products component 122, customer component 124 and/or vendor component 126. For example, a unique custom homepage 153 may be created for one or more customers 54 having information stored within the customer component 124 such that products and customer pricing offered by the associated dealer 150 on each customer's homepage is customized for that associated customer.

Under this arrangement, the customer 154 may be required to log onto or otherwise authenticate to the website of the dealer 150. If properly logged in, a webpage is returned to the customer 154, e.g., to a web browser operated in a suitable execution environment on a customer processing device 102B, in the form of a customized homepage so that information provided to the customer 154 is tailored to the business needs of that customer 154. This may include communication of customer-specific product offerings, customer-specific pricing, product descriptions, private messaging, etc. The data/resources 136 may also be utilized to store historical information so that previous purchases, purchase histories, recommendations and other information can be generated for the benefit of the customer 154, including statistical as well as historical information.

Figure 3:
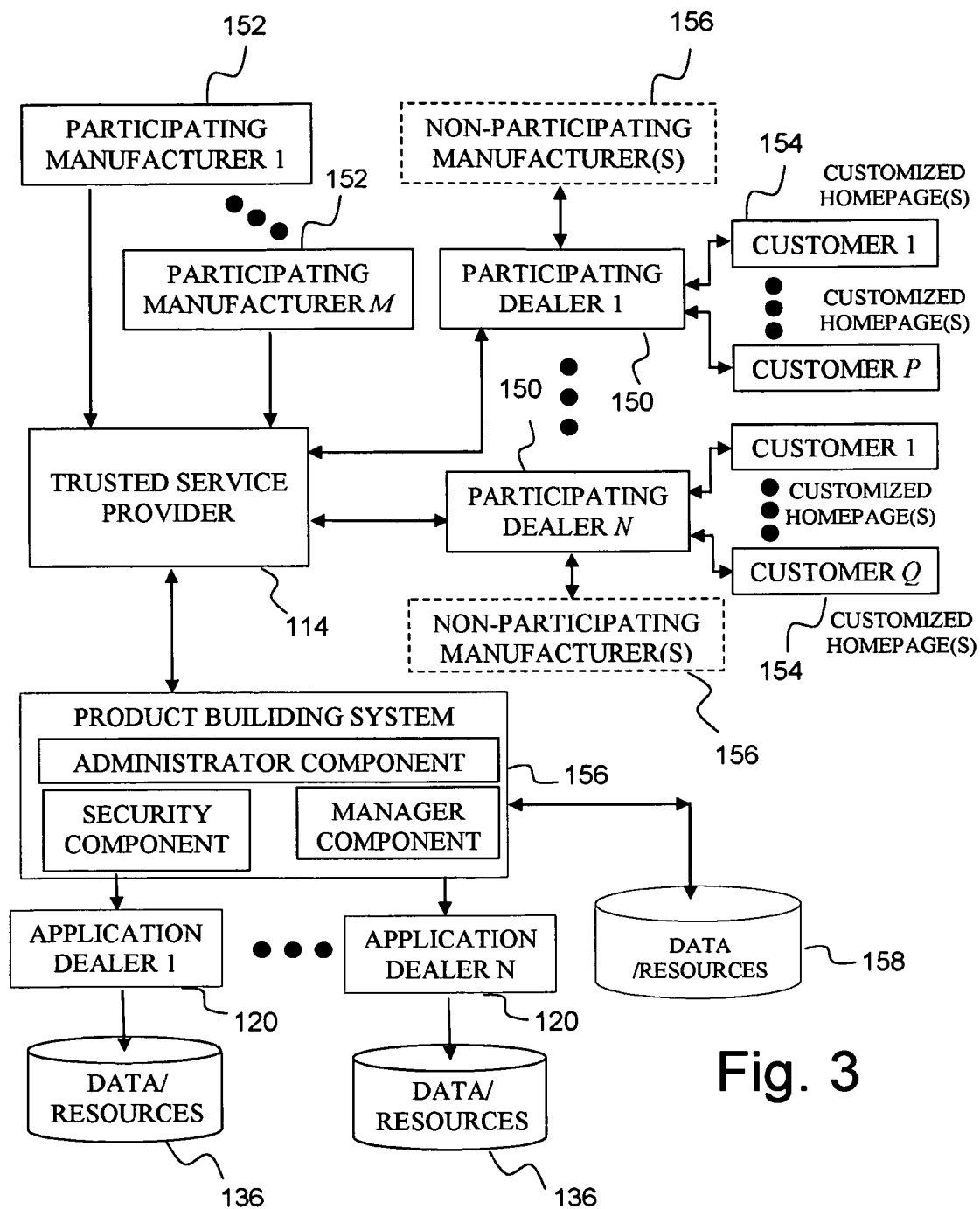
FIG. 3 is a schematic illustration of an e-commerce system that may be deployed across multiple dealers and multiple manufacturers.

Referring to FIG. 3, various aspects of the present invention may be practiced across an industry or portion thereof, such as by utilizing a product building application 156 for deployment by a trusted service provider 102D. As will be described in greater detail herein, the product building application 156 may be used to generate a plurality of dealer application instances, e.g., instances of the dealer application 120 discussed with reference to FIG. 2, where each dealer application instance 120 is associated with a corresponding participating dealer 150.

The trusted service provider 102D may also associate each of a plurality of participating manufacturers 152 with corresponding ones of a plurality of participating dealers 150. For example, using data/resources 158, the product building application 156 may store for each participating manufacturer 152, a list of participating dealers 150 that do business with that participating manufacturer. Once set up and running, the product building application 156 receives communications from the participating manufacturers 152, e.g., as may be related to product cost or product availability. Using the lists or other implemented associations, the product building application 156 conveys the communicated information from the participating manufacturers to their associated participating dealers, e.g., via the interface component 138 of the associated dealer application instances 120 to automatically update the manufacturer information in the corresponding dealer application instances 120.

The dealer application instances 120 utilize the updated information communicated directly from their participating manufacturers to automatically adjust customer homepages so as to update information the next time the associated customer views their homepage on the corresponding participating dealer's website.

The product building application 156 may also store relevant data and provide that data to the various participating entities, e.g., participating dealers 150, participating manufacturers 152 that wish to participate in the e-commerce system. The trusted service provider 102D utilizes a product building application 156 in combination with system knowledge 158, e.g., a data storage arrangement configured to store relevant information for use by and/or for the various entities that participate in the e-commerce system.

The system shown in FIG. 3 is substantially similar to that shown with reference to FIG. 2, but has been expanded out to support multiple instances of the application 120 that may or may not be integrated at various levels. As such, the product building application 154 may include multiple participating dealers 150, each independently interacting with their participating manufacturers 152 and their corresponding customers 154. The participating dealers 150 may also interact with non-participating manufacturers 156, as described more fully herein. However, in FIG. 3, multiple participating dealers 150 and multiple participating manufacturers 152 can utilize the trusted service provider 102D to facilitate dealer, manufacturer and customer integration.

In an exemplary implementation, the product building application 156 includes an instance of the application 120 for each participating dealer 150. As such, the data, programming code, website creation and customization is uniquely controlled by the associated dealer 150. For example, each dealer 150 may be required to log into their specific instance of the application 120, e.g., via the administration component 142. Thus, applications for multiple dealers may be hosted by the same Internet service provider/trusted third party. However, each dealer 150 maintains independent control over their instance of the application. The product building application 156 also manages and maintains each instance of the applications 120, such as by serving as an intermediary to distribute information between the participating manufacturers 152 and their corresponding participating dealers 150. Under this arrangement, each participating manufacturer 152 has a convenient means of communicating with their dealers. Thus, for example, each participating manufacturer 152 can target communications, messages and product related information to one or more of their specific participating dealers 150, such as to offer a special cost, or to indicate changes in a product, or the participating manufacturer can communicate information to all associated participating dealers. Similarly, the participating dealers 150 can communicate with one or more participating manufacturers in a convenient and integrated manner.

The product building application 156 may also serve as a translator, common platform and otherwise provide necessary intermediary services to enable not only communication, but direct integration of manufacturer and dealer data. For example, if a participating manufacturer 152 updates a price, inventory level, product availability, etc., that information may be directly integrated into the data/resources 158 and/or the data/resources 136 of the corresponding authorized dealer(s) 150 and that data, e.g., product availability or product description, may further automatically populate customer homepages so data is exchanged in (near) real-time and is fully integrated at the manufacturer, dealer and customer levels. Moreover, a participating manufacturer 152 may provide updates to specific dealers 150 or the participating manufacturer 152 may make global changes. Thus, as an illustrative example, a participating manufacturer 152 can update a price for all of its dealers 150 in a single transaction with the product building application 156. In this regard, the product building application 156 assumes all of the administrative activities required to deliver the updated information to the appropriate dealers 150. As yet another illustrative example, a participating manufacturer 152 may target one or more dealers 150 for corresponding transactions, e.g., to deliver a private message, to offer a special price, etc.

Alternatively, components of the product building application 156 may be distributed into one or more individual application instances 120, which may be distributed collectively between the trusted service provider 102D and the various participating dealer servers 102B. Under this configuration, the product building application 156 still maintains administrative functions to coordinate and facilitate interaction between transacting parties as set out more fully herein.

The product building application 156 may also implement administrative functions, e.g., via an administrative component, such as to enable or disable participating dealers 150 and/or participating manufacturers 152. For example, if a dealer 150 or manufacturer 152 no longer wishes to participate in the system, the product building application administration can disable all or certain aspects of access to the product building application for that entity. As another example, if a dealer 150 is removed as an authorized dealer for a select participating manufacturer 152, the product building application 156 discontinues sending updated information to that (now) unauthorized dealer. In this regard, the product building application may contain lists, e.g., within the data/resources 158, that associate participating manufacturers and corresponding participating dealers.

Still further, the product building application 156 may include storage for storing some or all of the information associated with each participating manufacturer 152. For example, the participating manufacturers may choose to store product descriptions, product availability and other data with the product building application 156. This may enable efficient updating and population of participating dealer information. As another example, each participating manufacturer may maintain all their data on a server that they control and/or each participating manufacturer 152 may decide to distribute information across multiple sources. For example, sensitive information, such as cost and discounts may be maintained and controlled by the manufacturer's servers 102C and this information can be pushed and/or pulled by the product building application 156 as needed. Further, product descriptions, product literature, etc., may be communicated to the product building application 156 for storage therewith.

Still further, in a manner analogous to the system described with reference to FIG. 2, the data, components, etc., involved in integrating the e-commerce system can be distributed across multiple processing devices. For example, certain participating manufacturers 152 may have their own web servers 102C and may not want certain data stored remotely, e.g., on an internet service provider's server. As such, the product building application 156 serves as an interlinking device so that the data stored on the manufacturer's server 102C can be used to directly populate data in the corresponding authorized dealer's instance of the application 120.

Still further, each instance of the application 120 need not be stored on the same server. For example, certain participating dealers 150 may want to maintain tighter control over where their application 120 and corresponding data/resources 136 are located. Alternatively, it may be practical to distribute the instances of the application 120 for each participating dealer 150, such as where the participating dealers 150 are separated by excessive physical distances, time zone differences, etc. This also allows different participating dealers 150 to select their own hosting service and/or host the application 120 on an internally controlled server within their business enterprise, but still be integrated via the product building application 156.

According to an aspect of the present invention, the participating manufacturers 152 communicate manufacturer specific information to the product building application 156 provided by the trusted service provider 102D for communication with corresponding targeted or non-targeted participating dealers that are associated with, e.g., transact business with the manufacturer that initiates the communication. The manufacturer specific information may comprise, for example, product information including product descriptions, images, downloadable literature, sales sheets, flyers and other types of information. The participating manufactures 152 may also communicate manufacturer price, discount, sale, special, liquidation, one-time-only and other business information. The manufacturer information is distributed to the associated ones/targeted ones of the participating dealers 150 by the product building application 156.

As such, the product building application 156 may include security features that allow participating manufacturers 152 to designate which participating dealers 150 receive or otherwise have permission to access their data. For example, the product building system 156 may utilize a data manager component that controls information written to and read from the data/storage 158. To gain access to information therein, a dealer 150 may be required to have appropriate permissions or security credentials that are verified by a security component of the product building application 156. For example, the product building application 156 may utilize the security component to verify credentials set in each dealer instance of the application 120, such as by setting up appropriate attributes in one or more of the vendor component 126, profile component 128, policies component 130 and/or administration component 142. As noted in greater detail above, a participating manufacturer 150 may also update its information in a single communication to the trusted product building application 156, which may immediately distribute the updated information to the participating dealers 150 associated with that manufacturer that are qualified to receive the information. Moreover, information provided from a participating manufacturer 152 to each associated dealer 150 or subgroup of dealers may be different, e.g., to offered preferred pricing, products, availability, etc., and thus communications to specific dealers may be targeted and individually communicated as will be described more fully herein. Those dealers 150 affected by the updates can then automatically adjust their business, e.g., adjust their customer prices so that the price quoted to a customer reflects up to date information.

By utilizing an instance of the application 120 for each participating dealer 150, either in a stand-alone embodiment such as described with reference to FIG. 2, or in a multiple dealer system as described with reference to FIG. 3, the participating manufacturers 152 can systematically and consistently distribute product information and control other business related communications with their dealers. Moreover, each participating dealer 150 may receive up to date, accurate and consistent information as it is provided by the manufacturer itself and is directly populated into that dealer's databases.

An Exemplary Web Based Software Model

Figure 4:
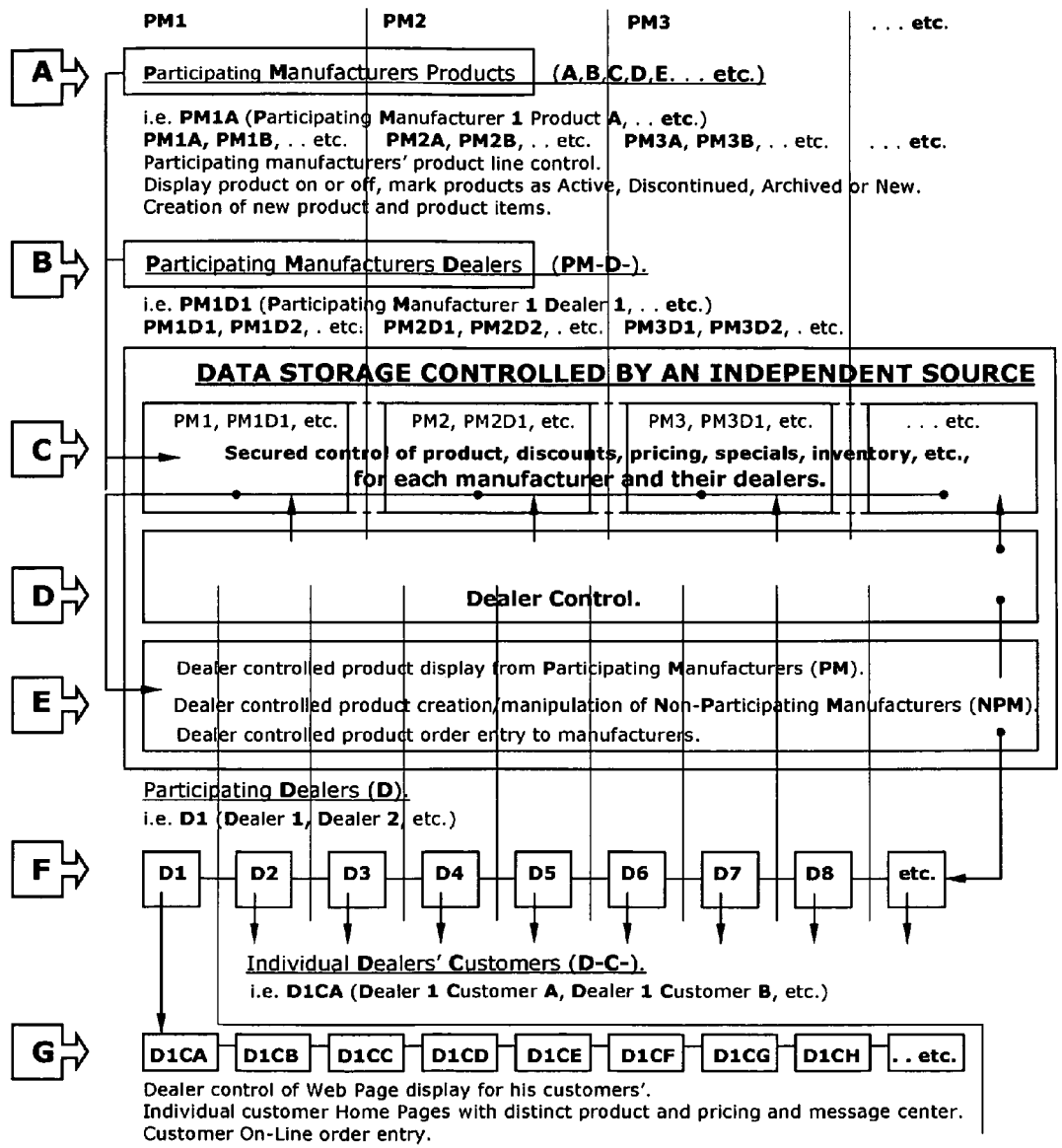
FIG. 4 is a schematic illustration demonstrating the integration of manufacturers, dealers and customers into an integrated e-commerce system according to various aspects of the present invention.

According to various aspects of the present invention, an exemplary implementation of the e-commerce system illustrated in FIGS. 2 and/or 3 is described with reference to the Web Based Software Model flow diagram illustrated in FIG. 4. With reference to the section of the diagram designated by the block arrow A, the web based software model utilizes the designation PM—to distinguish participating manufacturers and/or distributors, e.g., PM1 represents participating manufacturer 1, PM2 represents participating manufacturer 2, PM3 represents participating manufacturer 3, etc., which correspond to the participating manufacturers 152 illustrated in FIGS. 2-3.

Each participating manufacturer PM identified to the software model e.g., the dealer application 120 and/or product building application 156, offers products, etc., designated for purposes of illustration herein as A, B, C, etc. As such, PM1A is used herein to designate product A of participating manufacturer 1, etc.

Participating manufacturers control at least certain aspects and/or attributes of the products that they make available to their dealers via the dealer application 120 and/or product building application 156. For example, in the multi-dealer system of FIG. 3, each participating manufacturer may make information available to its dealers, such as by providing data to the application 156. A manager component of the application 156 may consult a list or other reference, e.g., within the data/resources 158 to identify corresponding participating dealers. The application 156 may then may populate the instances of the dealer application 120 associated with each identified dealer, e.g., by updating data associated with the products component 122 and/or vendor component 126 of one or more of the dealer instances of application 120. The manager component functionality may also be implemented, for example, by a client executing on the server 102C of the participating manufacturer so that the data is automatically and electronically communicated to each associated dealer so as to automatically update the dealer instance of the application 120.

Once the participating manufacturer 152 electronically conveys their products to the application 120 and/or application 156, the manufacturer may exhibit significant control over the product lines available to their dealers 150 by controlling select product data attributes of the data stored by the application 120. For example, each participating manufacturer may have control over predetermined product data attributes included in product information communicated to the corresponding dealer, wherein the corresponding dealer cannot control, e.g., modify, edit, delete, etc. the predetermined product attributes controlled by the manufacturer from within the application 120, e.g., by utilizing the products component of the application 120.

As an illustrative example, a participating manufacturer 152 may be able to control a product attribute that relates to availability of their products within a dealer application instance. Thus, the participating manufacturer may be able to designate their products with a status attribute such as Active, Discontinued, Archived, New, etc. The participating manufacturer may also be able to adjust a product status attribute such as "available quantity", etc. Thus, status attribute(s) may be utilized by the manufacturer to adjust availability of the manufacturer's products within the dealer application so as to affect the products that the dealer may offer for sale on their website.

Moreover, the application 120 may implement a policies component 130 that evaluates a value of a first status attribute associated with the products offered by the dealer application that is controlled by a corresponding manufacturer and to evaluate a second product attribute that is controlled by the dealer to decide which products may be seen by customers on each customer home page. For example, a participating manufacturer 152 may be able to toggle a first display attribute of their products on or off so that their associated dealers 150 have visibility of only select manufacturer products within the application 120. Similarly, a dealer may be able to toggle a second display attribute on or off to limit or otherwise select out a limited number of manufacturer products that are toggled on by the manufacturer, to generate the customer homepages for the customers of the dealer.

Still further, each participating manufacturer 152 may configure the products and display information in a manner that is unique to each associated participating dealer 150, if that manufacturer so chooses. A specific implementation of these features is provided in an example that is described in greater detail below.

With reference to the section of the diagram designated by the block arrow B, one or more dealers are also associated with the application 156, e.g., the participating dealer(s) 150 shown in FIGS. 2-3. Each participating dealer 150, designated generally as D—may be associated with one or more participating manufacturers 152. For convenience and simplification of discussion herein, associations between manufacturers and corresponding dealers are designated by concatenating a manufacturer designation with a dealer designation. For example, for participating manufacturer PM1, there may be any number of associated dealers, e.g., PM1D1, PM1D2, PM1D3, etc.

With reference to the section of the diagram designated by the block arrow C, an exemplary portion of the data/storage is schematically represented, such as the data/resources storage 136 shown in FIG. 2 if implemented in a single dealer format, or the data/resources storage 136, 158 shown in FIG. 3 if implemented using the trusted service provider 102D. As illustrated, each participating manufacturer 152 may have and/or utilize a designated storage area to store information associated with that manufacturer. The storage area may be secure, e.g., by requiring a login and password for the manufacturer to access the data associated therewith. Alternatively, the associated manufacturer can communicate such information to the product building application 156, which itself manages and stores the data provided by the participating manufacturer 152.

Each participating manufacturer 152 may control aspects including the identification of authorized dealers, product information, as well as related business information, such as discounts, pricing, specials, inventory, etc. Each participating manufacturer 152 can also set different values for the provided parameters and product attributes for each associated participating dealer 150, or a set of parameters and product attributes may be applied to the instance of each application 120 corresponding to an associated participating dealer 150. Thus, a participating manufacturer 152 may, for example, set a dealer cost for a product offered for sale by one dealer that is different from a dealer cost for the same product offered for sale by another dealer.

Moreover, a participating manufacturer 152 can update the prices, availability and other information in the instances of the application 120 associated with participating dealers 150. As an example, the information provided by a participating manufacturer 152 may be used to automatically update the databases corresponding to the products component 122 and/or vendor component 126 of the instance of the application 120 associated with each authorized dealer 150 in real time by pushing the data to the application instances of the corresponding dealers 150. The data may also be pulled by the application instances of associated dealers 150, e.g., when the dealer causes its dealer application to rebuild or refresh its data. For example, a participating manufacturer may post changes to the application 156. The application 156 may distribute the changes to the affected application instances of corresponding dealer(s), such as by updating the changes when a dealer's instance of the application 120 logs into the application 156.

With reference to the section of the diagram designated by the block arrow D, it is shown that the application 156 provides a bridge between data that is controlled by participating manufacturer(s) and data that is controlled by dealers and their relationships with their customers so that manufacturer information, dealer information and customer information can be integrated into a single source in a secure and efficient manner.

With reference to the section of the diagram designated by the block arrow E, in a manner analogous to that described above for the participating manufacturers, participating dealers have control over certain aspects of the data utilized by the system. Each participating dealer 150 may have a designated storage area that can be utilized to store information associated with that dealer 150. The storage area may be secure, e.g., by requiring a login and password for the dealer 150 to access the data associated therewith.

The participating dealers 150 use the website builder component 132 of an associated instance of application 120 to build an e-commerce website that may include customized homepages for some or all of their customers. According to various aspects of the present invention, each dealer 150 may not be required to possess extensive web page building knowledge as the application can automatically generate the web pages. Moreover, the dealer 150 does not need to devote extensive amounts of time and energy, as is typically required in many dealer businesses, to keep the dealer's product descriptions, offerings and other product related information up to date because the participating manufacturers 152 may directly provide some of the necessary information. Moreover, the application 120 takes care of formatting and presenting the information in the data/resources 136. Thus, the dealer 150 can concentrate on performing tasks directly bearing on their business.

Dealers 150 may utilize the products component 122 of their instance of the application 120 to control the products that they want to display from their associated manufacturers. Thus, a manufacturer may upload, transfer or otherwise electronically communicate information related to multiple products to the products component 122 of a corresponding dealer application 120. However, the dealer 150 can then select among the products available within the products component 122, which are to be made visible to the customers of the dealer 150. Moreover, dealers 150 may control product creation, such as to include products from nonparticipating manufacturers, as will be described in greater detail herein. Dealers 150 may also control for example, product order entry to manufacturers to obtain products for sale to their customers. Still further, dealers 150 may utilize the customer component 124 to control customer information and to control information relating to customer orders from the dealer 150.

With reference to the section of the diagram designated by the block arrow F, the information in the data storage, e.g., as described with reference to the block arrows C, D and E may be utilized by participating dealers 150, who are designated herein as D-, e.g., D1, D2, D3, etc. Individual dealers conduct business with their customers, who are designated herein as C-. For convenience and simplification of discussion herein, associations between dealers 150 and corresponding customers 154 are designated by concatenating a dealer designation with a customer designation. Accordingly, for example, the customers of dealer D1 are designated D1CA, D1CB, D1CC, etc. Similarly, customers of D2 are designated generally as D2CA, D2CB, D2CC, etc.

With reference to the section of the diagram designated by the block arrow G, several exemplary customers are illustrated as being associated with the dealer D1. Each of the other dealers may also have any number of customer relationships, which are not shown in the figure. Thus, any number of customers can be associated with any of the participating dealers 150, e.g., designated at the block arrow F. According to an aspect of the present invention, each dealer 150 can control the web-based homepage display for one or more of its customers. The homepage display can be customized on a customer basis so that individual customers have homepages with distinct product and pricing options. Further, purchasing histories, statistics and/or other useful information may be customized on a per customer basis. Thus, when a customer logs onto their homepage, a tailored web experience is available. Additionally, as will be described in greater detail herein, a message center may be provided for facilitating communication between the customers and the corresponding dealer 150. The message center may also facilitate communication between dealers 150 and corresponding manufacturers 152.

In addition, the webpage display, which may be customized for individual customers, may provide an online order entry. Still further, the webpage display may provide product details and information, which may be derived from the participating manufacturer information received as described with reference to block arrow C. In this regard, the dealer may augment or otherwise supplement the manufacturer provided information, such as by providing annotations, comments and other information. Alternatively, where the information is provided by a nonparticipating manufacturer, then the information may be manually entered by a dealer 150 and provided to the customer 154 via the customer homepage.

Accordingly, the software application according to various aspects of the present invention enables a link of information from participating dealers 150, manufacturers 152 and customers 154. Each dealer 150 may also add nonparticipating manufacturer's product information to the application so that each customer webpage can seamlessly integrate the entire line of products offered by the dealer 150. Moreover, the integrated system allows manufacturers, dealers and customers to transact with consistently managed and formatted current information.

Figure 5:
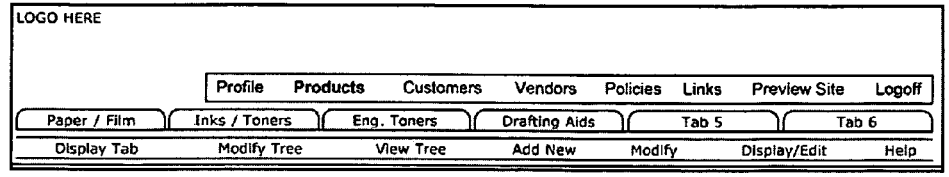
FIG. 5 is a screenshot of a menu of an exemplary implementation of various aspects of the present invention.

With reference to FIGS. 2, 3 and 5 generally, a menu bar for an exemplary implementation of the application 120, 156 is illustrated according to an aspect of the present invention. The application includes a menu bar that displays menu options to access a Profile, e.g., a selection for adjusting a profile corresponding to the profile component 128, a Products option corresponding to the products component 122, a Customers option corresponding to the customer component 124, a Vendors option corresponding to the vender component 126, a Policies option corresponding to the policy component 138, a Links option, a Preview Site option corresponding to the website builder component 132 and a logoff option, which allows a validly signed on user to log off the application, e.g., as controlled by the administration component 142.

The exemplary products or product categories shown across the middle row as a set of tabs are shown by way of illustration and not by way of limitation to demonstrate a dealer for paper products and thus includes tabs for the types of products or product categories that the dealer may be interested in selling. Depending upon the specific implementation, these product and product category tab labels may be different. Each tab may also be associated with a "tree" that organizes fields, attributes and other information associated with that tab, e.g., a specific product or product category. Exemplary Tree controls are also included to view the tree, modify and add to the tree, edit the tree, etc. The various functions of these menu options will be described in greater detail below.

Figure 6:
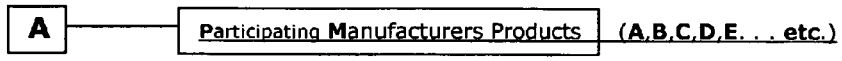
FIG. 6 is a screenshot of an exemplary implementation of block A of FIG. 4 according to various aspects of the present invention.

Participating Manufacturers:

With reference to FIG. 6, a sample screenshot is provided to illustrate exemplary information that may be provided and/or controlled by a participating manufacturer. As noted in greater detail above, participating manufacturers 152 and dealers 150 have access to product building commands so that participating manufacturer's products can be automatically provided to the corresponding dealer 150. As such, a corresponding dealer 150 does not have to re-enter duplicate information to build custom web pages for their customers. As will be described in greater detail herein, some information provided by participating manufacturer may not be controlled, e.g., edited or changed by a corresponding dealer 150. However, the dealer 150 may be able to augment product information data, such as by providing a private label code that corresponds to a manufacturer product code to reflect a dealer private branding or re-labeling.

Conceptually, participating manufacturers 152 have control over product creation and attribute identification. For example, participating manufacturers 152 may input product numbers, product descriptions, pricing, discounts, specials and individual dealer discounts, product status, e.g., active, discontinued, archived or new, and other relevant information that may be of interest to the dealer 150 or the dealer's customers 154. In this regard, the participating manufacturers may be able to log into the dealer application 120 and use the screens, such as illustrated by the exemplary screen of FIG. 6. For example, a participating manufacturer may utilize a web browser or other suitable software to access the application 120 remotely across a network. Thus, the interface component 138 may be configured to enable participating manufacturers to log into the application and navigate to the products component 122 for creation and/or modification of product attributes of the manufacturer's products. As another illustrative example, the participating manufacturer can electronically communicate information to the dealer application 120 that populates the corresponding product fields, e.g., by requiring the dealer to execute a suitable import utility.

Further, according to an aspect of the present invention, participating manufacturers 152 have complete control of the product line that each dealer 150 has access to. Moreover, the participating manufacturers 152 may also have an on-line message center for all the dealers 150 associated with them, as noted in greater detail herein.

FIG. 6 shows an exemplary product created by a participating manufacturer 152. The product and inputs encompassed within the square boxes designated with identifiers 202, 204, 206, 208, 210 identify inputs, parameters, attributes and other controls that the participating manufacturer 152 may have control over. According to one aspect of the present invention, participating dealers 150 have no control over these inputs other than private labeling of a product number as will be described in greater detail herein.

With reference to the section of the figure designated by 202, the Product # field is the manufacturer's product identification number. According to an aspect of the present invention, a dealer 150 may link to this number when creating purchase orders to order products from the associated manufacturer 152. Private labeling this number may be performed by the dealer 150 in the modify product command on the dealer side of the software as will be described in greater detail below.

The Type field within box 202 may comprise an attribute that associates a template, which may be used by the manufacturer 152 to enter product data as shown in box 210, and which may be used by corresponding dealer(s) for the display of the product and product information. Any number of templates may be utilized, depending for example, upon the product, the industry and other factors that affect the nature of the dealer's business.

Referring to FIG. 7, an exemplary template is illustrated. The exemplary template corresponds to a template useful when the product can be described primarily in terms of size, description and a quantity pricing/tiered pricing structure. In the example data, three tiers are shown. However, any number of tiers may be utilized. Moreover, during operation, the tier structure can be changed to modify either the number of tiers or the quantity of units associated with each tier. Other modifications may also be implemented as required by the specific implementation.

As further examples, a variation of the template of FIG. 7 may be useful when the product can be described primarily in terms of a size and a description and where no tier structure is desired or required. Under this arrangement, the template tier/quantity purchasing fields may be replaced with a single input for quantity and a single row of fields is provided. Another exemplary template may be useful where a product can be described primarily in terms of a description where no tier structure is desired or required. Under this arrangement, the template tier/quantity purchasing field may be replaced with a single input for quantity, the size field may be eliminated and a single row of fields is provided.

As yet another illustrative example, a template type may be provided that is used primarily for input of items with description fields only. The items attached to the system by this exemplary template may be part of another product's items and may thus be linked to that product. Such items may have no data of its own other than data from the linked-to item. If the data changes in the original, linked-to file it will thus also change in this products template.

Referring back to FIG. 6, the product status within box 202 may be used by the manufacturer to identify one or more status codes associated with a corresponding product. Exemplary status codes may comprise, for example, active, discontinued, archived and new. As an example, an active status code may designate the product is available from the manufacturer. This status code may further designate that the manufacturer is making the corresponding product available to the associated dealer 150, at least by virtue of the product being posted by the manufacturer into the dealer's system. As such, the dealer 150 may opt to display or not display (potentially on a per customer basis), whether or not the product is displayed for sale to customers 154 of the dealer 150. This is an illustrative example of the integration of manufacturer control of data of interest to the manufacturer that is also availably for utilization by corresponding dealers 150.

Referring to FIG. 8, an example of an active status code is shown. The status of the product, 7923D, is active and is designated as such using any suitable means, e.g., setting the text to a predetermined color, such as blue, to designate active. Alternatively, indicia such as the word "ACTIVE" may be provided to identify the product as active. The description shown may be the result of dragging and holding the cursor over the product #. If it is active it is still available from the manufacturer and will continue to be displayed on the participating dealer websites.

As another example, a product may be identified as discontinued, such as by assigning a suitable status code, such as "Disc", "DISCONTINUED" or some other indication. The discontinued designation may be positioned behind the product number, e.g., behind product 7923D or in other suitable place to identify the product has been discontinued. For example, the product designation 7923D may be replaced with the designation 7923D (Disc). Thus, the types available for the category "Film" in an illustrative example may include 7923D (Disc) 7924C 7924D. If a product has been given a discontinued status code, it may still be available from the manufacturer on a limited basis, e.g., until supplies run out. The dealer 150 may also have product in stock that can be sold until it runs out. According to an aspect of the present invention, the discontinued status code may automatically trigger a predefined message or modification to the data displayed to the dealer 150 and/or dealer's customer 154. For example, the dealer 150 may see a message that indicates: "Discontinued, while supplies last, call for availability". Moreover, discontinued products may be further designated, such as using a different colored text, such as red, when it is viewed by the dealer 150 and/or the customers 154 of the corresponding dealer 150.

As yet another example, a product may be identified as archived, such as by assigning a designation to identify the product has been archived by the manufacturer. A status code of Archive may be displayed using a suitable designator, such as the key word "Arch", "ARCHIVE" or some other suitable designation. Moreover, the "archive" designation may be displayed in a color that is different from the remainder of the text, such as a half tone green or other color. If archived, the product will not display on the dealer/customer websites because it is no longer available from the manufacturer. Thus, the illustrative example shows "Film" types that are available include 7923D 7924C 7924D. If product 7923 is archived by either a participating manufacturer 152 or the dealer 150 (in the case of a non-participating manufacturer), then the customer would only see the options under the "Film" category as 7924C 7924D. However, the archived product may be display by the "dealer modify command" to be described in greater detail below.

As yet another example, a product may be identified as New, such as by assigning a designation to identify the product has been newly added by the manufacturer. A status code of New may be displayed using a suitable designator, such as the key word "New" or some other suitable designation. Moreover, the "new" designation may be displayed in a font/effect/color that is different from the remainder of the text, such as bold lettering with the word "(New)" behind the product identifier. As an illustrative example, the product designation 7923D may be replaced with the designation 7923D (New). Thus, the types available for the category "Film" may include 7923D (New) 7924C 7924D. Additional status codes may be provided in the alternative to, or in addition to exemplary status codes identified herein.

An exemplary Highlight option within box 202 is illustrated as a box of text just below the selected product category ("Film" in the illustrative example). The highlight provides a brief description of the product and may also be used, for example, when the user drags the cursor over the product prior to selecting it.

Referring back to FIG. 6, the illustrated Description field within box 202 corresponds to the manufacturer's description of the product. This may be viewed, for example, when the user selects the product and clicks on the view description command.

The box designated 204 may be used by the participating manufacturer 152 to designate a product discount provided to a corresponding dealer 150. This box may be color coded or otherwise distinguished in the display. In the example illustrated in FIG. 6, for the product 7923D, the discount is 80%. However, the participating manufacturer 152 may have complete control over the discount for every product in the product line for every participating dealer 150.

The box designated 206 may be used to specify manufacturer price increases, such as in a percentage format. When the manufacturer 152 keys in an increase of a certain percentage the "New List/Cost" field next to each item will take that percentage keyed in and adjust the items by that percentage using the existing list or cost price. Also, the manufacturer 152 may still be able to individually edit any of the items new list prices, e.g., by just keying in that price. Thus, the new list/cost field temporarily stores an adjustment to the current list/cost until a future triggering event causes the updated value entered into the new list/cost field to replace a current list/cost field. The triggering event may comprise a manually driven action or an automated process.

As a few illustrative examples, to accept the price increase the manufacturer 152 may select an "accept price increase" or "Accept Modifications" command. By doing so, the new list price information will be saved for future updates. An "Update" or other suitable command box may be activated when the actual price change is to take effect, thus serving as the triggering event. Alternatively, a date box or other suitable control may be implemented such that updates for future price changes can be input into the system before the actual price change takes effect. At some future time, a triggering event, e.g., when a date field is met, when a timer field expires, when a user presses an "Update button, etc., the "Current List/Cost" will be replaced with the information previously computed and added to the "New List/Cost" boxes. When this is done the numbers in the "New List/Cost" boxes can return to $0.00, such as to designate that the new price/cost information is in effect. According to an aspect of the present invention, this action may also automatically update the prices as seen on the homepage of the affected customers.

Once the New/List Price has been determined, the Dealer Cost box can be re-computed, such as based upon the corresponding newly adjusted list/cost for that product and the Actual dealer discount described with reference to the box designated as 204.

The box designated 208 may be used to designate a product number, e.g., the manufacturers' number and optionally, a corresponding status code, such as the status code described with reference to box 202. If the dealer 150 chooses to private label a product item, the dealer 150 may, for example, select the down arrow just to the right of the product in box 208 and type in the product number in the box provided. As an example, a link may be maintained by the application between the product # in box 202 and the corresponding product number in box 208. This number will now be displayed in lieu of the manufacturers' number when viewed by the dealer's customers 154. However the manufacturers' number will always be available to reset the product number in box 206. When ordering product by the dealer 150 from the manufacturer 152, the manufacturer's number and/or the private label number may be displayed, but the order to the manufacturer 152 will likely reference the manufacturer-provided product number in box 202.

With reference to FIG. 9, an exemplary screen display is illustrated that provides product listings and product status, such as may be displayed on a customer home page of the dealer's website. As noted in greater detail above, if a product is active, it is still available from the manufacturer 152 and may be displayed on the participating dealer website and/or customer homepages as illustrated by the exemplary product 7923D24A if the dealer 150 turns the display of that product on (for the corresponding customer). If a product is discontinued, it may display, for example, Discontinued, while supplies last, call for availability, e.g., in red, behind the product number when the discontinued product is viewed by customers on their homepage of a corresponding dealer website as illustrated by the exemplary product 7923D30A. If a manufacturer 152 has designated a product as archived, it will not display on the dealer website or the customer home pages. The screen display illustrated in FIG. 9 may also be exemplary of what a dealer 150 may see when the dealer 150 selects the product to add to the customer's home page and/or when the customer is viewing products for purchase, e.g., to add to the customer's shopping cart.

With reference back to FIG. 6, the box designated as 210 identifies product attributes, such as those illustrated and described above with reference to the template in FIG. 7. Typical product description fields will likely vary, depending upon the nature of the products. Keeping with the example of paper products, typical product description fields may comprise size, length/sheets, which specifies product dimensions, carton quantity (Crtn. Qty), which specifies the quantity or units of product per package or Item Discount %, which specifies an amount that the manufacturer 152 discounts a product. For example, in some cases the manufacturer 152 will give a particular dealer 150 a price for a specific item that is better than the price offered to other dealers 150. This additional discount will affect the cost only, it will not reduce the dealers sales cost. If the dealer 150 wants to reduce the dealers' sales cost and web price to pass along the discount to customers, the dealer 150 need only key in a negative value in the adjusted cost column (Adj. +/−) Cost field seen just to the right of box 210 for that particular item.

The Dealer Cost field in box 210 shows the actual cost to the dealer 150. The cost comes from taking the current list/cost of the item, multiplied by the reciprocal of the actual discount plus any additional per item discounts. The New List/Cost field may either be keyed in individually for each item, showing the new list price of that item, or by keying in the manufacturers' percentage increase. This will take the current list price, multiplied by the percentage increase, and display the results in the New List/Cost field next to each item. If this is done, the manufacturer 152 will still be able to key in over the price for any item with a new price. The Current List/Cost field is the current list or cost of the item. Changing this number will change all the fields accordingly, including the dealer's web price and the dealer customers' homepage pricing. The Accept Modifications command, located at the center bottom of the screen just below box 210, will save the product with all the modifications that were input. While numerous approaches were illustrated for computing list and cost amounts, other techniques may alternatively be implemented.

Participating Dealers

In a manner analogous to that described with reference to the participating manufacturers 152, the participating dealers 150 may also have control over certain aspects of the product data. For example, with reference to FIG. 10, an exemplary screen shot illustrates representative aspects that a participating dealer 150 may control. The box designated as 212 identifies a field to record the distributor. This is the supplier of the product from whom the dealer 150 is actually purchasing the product from. Where the distributor is not also the manufacturer, the dealer 150 may enter the appropriate distributor information into the application 120, 156, e.g., using the vendor component 126 so that the distributor information is stored in a suitable vendor file. This information may also be utilized when the dealer 150 creates a purchase order for the selected product. In many instances, the distributor and the manufacturer may be the same entity.

The box designated as 214 identifies Product # and optionally, other types of information, such as Private Label fields. The illustrated private label field may be defaulted to the manufacturers' product number with reference to box 202 in FIG. 6. The dealer 150 cannot change the manufacturer-supplied product number. However, the dealer 150 may have the option of adding a private label, such as by selecting the down arrow to the right of the product number and typing in a private label, or by using another suitable data entry technique. Since both the dealer provided private label and manufacturer-provided product number are stored, the application can display either value as the product number attribute such as illustrated in box 220. As an example, the private label IJF3MDM is shown at both 214 and 220. Moreover, a product listing, e.g., as may be displayed under the "Products" menu option as illustrated in FIG. 5, may display the private label as an alternative to the corresponding manufacturer product number.

The box designated as 216 identifies product discount information. In an illustrative example, there are 2 fields to key in, the "Sales Display" and "Add" fields. The Sales Display and Add fields will total up to the value displayed in the box designated "Actual". As an illustrative example, the Sales Display field has the value 78, the Add field has the value 2 and the Actual field has the value of 80. A change entered into either the "Sales Display" or "Add" fields will change the other to equal the discount in the "Actual" box, which is supplied by the manufacturer 152.

As illustrated, the "Sales Display" field contains a value corresponding to what the dealers' sales force and employees see. The "Add" field contains a value corresponding to any additional discount the dealer 150 wants to hold back.

As an example, if the list price of an item is $100.00 and the dealer has a discount of 80%, the dealer cost would be $20.00. If the dealer wants to hold back 2% for costs, the dealer only needs to key in 78 in the "Sales Display" field and 2 in the "Add" field. The two numbers keyed in will add up to 80% in the "Actual" field. By holding back, 2% in the current example, the dealer sales cost becomes $22.00. This "discount off of list" is the cost that may be used to base customer-based web pricing as will be described in some examples below. If the dealer price is not based on discount off of list, but cost only, the dealer can still hold back.

As yet another illustrative example, if the dealer cost is $20.00 and the dealer still wants to keep $2.00, the dealer may enter a value such as −10 (negative ten) in the "Sales display" field and 10 (positive 10) in the "Add" field. This will add up to 0% in the "Actual" field. The "Dealer Sales Cost" field is set to $22.00 and the actual dealer cost would remain at $20.00.

Thus, a field such as the "Add" field may be a useful tool for a dealer, such as when the dealer receives additional discounts from the manufacturers 152. If the dealer wants to keep the discounts and not pass them along, then the additional discount may be added in the "Add" field, therefore not changing anything but the dealer cost. Additionally, placing extra discounts in the add field will not effect the customer web pricing.

The box designated as 218 identifies a Minimum Sales Margin. This is the minimum margin the dealer will sell this product for to a customer. According to an aspect of the present invention, the dealer's sales force will not be able to quote any of the items, e.g., without the approval of the administrator, below the minimum sales margin. The margin used is based on the dealers' sales cost. Policies that affect aspects such as setting limits to sales quotes, defining whether discounts are passed along the customer, etc., may be managed, for example, by the policies component 130 shown in FIG. 2.

The Sales Price Margin field is filled in by the dealer with the appropriate markup desired for the corresponding product. The Sales Price Margin field may also be used from the dealer sales cost. According to an aspect of the present invention, the markup from the dealer cost may be utilized to generate the web price seen by the customers.

The box designated as 220 identifies the product #/Private Label. The product number is the manufacturers' number. If the dealer chooses to private label the item, a private label can also be created, as described in greater detail herein. The box designated as 222 identifies adjusted (+/−) Cost, which may comprise a field that allows the dealer to adjust sales cost to compensate for additional expenses, like shipping, for the associated item. In the exemplary illustration, the Cost field may accept positive or negative values. Any numbers entered will affect the web price. The Adjusted (+/−) Price option may allow, for example, the dealer to put in an adjusted price for any item where the dealer would like to make more or less of a margin. Any numbers entered will also affect the web price.

Non-Participating Manufacturers Product:

Referring back to FIG. 5, the exemplary implementation of the application 120 includes several Display Tab menu options including a "Display Tab" option, a "Modify Tree" option, a "View Tree" option, an "Add New" option, a "Modify" option and a "Display/Edit" option. A "Help" may also be provided. These menu options allow the user to generate titles with specific headings for the product from any manufacturer's product that a dealer may wish to be displayed on their web site, including information from nonparticipating manufacturers. According to an aspect of the present invention, the tabs may be editable to the manufacturers or dealers specific product categories. The tabs can also be displayed on or off on the customer's homepage. In an exemplary implementation, a hierarchy of displaying product starting from the tab is provided as a "tree" structure. Turning the tab off will turn off the display of all the product(s) created under it, regardless if the product is turned on.

As a few illustrative examples, a dealer may utilize the "Display Tab" option shown in FIG. 5 to toggle a selected tab on or off and/or to control the display of the tab, e.g., using standard graphic techniques, such as buttons, boxes and other graphic based controls. A dealer may also utilize the "Modify Tree" option shown in FIG. 5 to drill down under each displayed tab. According to an aspect of the present invention, this option allows the dealer to generate and manipulate a progression of descriptions to generate the actual location of the product to be created. Product can be entered anywhere along the tree progression. The headings of the tree may be manipulated, once created, as to the order of display. Moreover, the tree contents may be edited in any manner, e.g., to delete a heading where there is no product attached at the end of the tree progression.

As another example, a tree-like organization may be utilized to organize products. Selecting any of the view commands will open up the tree for display. Moreover, product information may be distinguished by manipulating bold, italics, underline, font selection, font color, font size and other display characteristics of the displayed information. Thus, bold descriptions may be utilized, for example, to indicate that the progression has not ended and there are remaining descriptions below it.

As yet another example, an "Add New" option may be provided as part of the application. This option may allow, for example, the dealer 150 to create product(s) to display on the dealer's website, from any non-participating manufacturer (once created in the vendor data base as described in greater detail above) from any tab at the end of any tree progression.

The first option when selecting the command may be to select an existing displayed vendor or add a new vendor from the database, e.g., as stored in the data/resources 136 described with reference to FIG. 2 or the data/resources 158 described with reference to FIG. 3. Once the manufacturer of interest is displayed in the list, the dealer 150 can manually add associated products.

The dealer 150 may be able to add a new vendor to the vendor database by selecting an "Add New" or other suitable command. When doing so, a list of the vendors may be displayed to choose from. By selecting an option, such as a "Click here to Add Products" option, the dealer 150 can add and view products for the selected manufacturer. For example, by selecting a manufacturer from a list, the products available to the dealer 150 by that manufacturer may be displayed, e.g., by product category or other desired ordering.

Figures 10, 11:
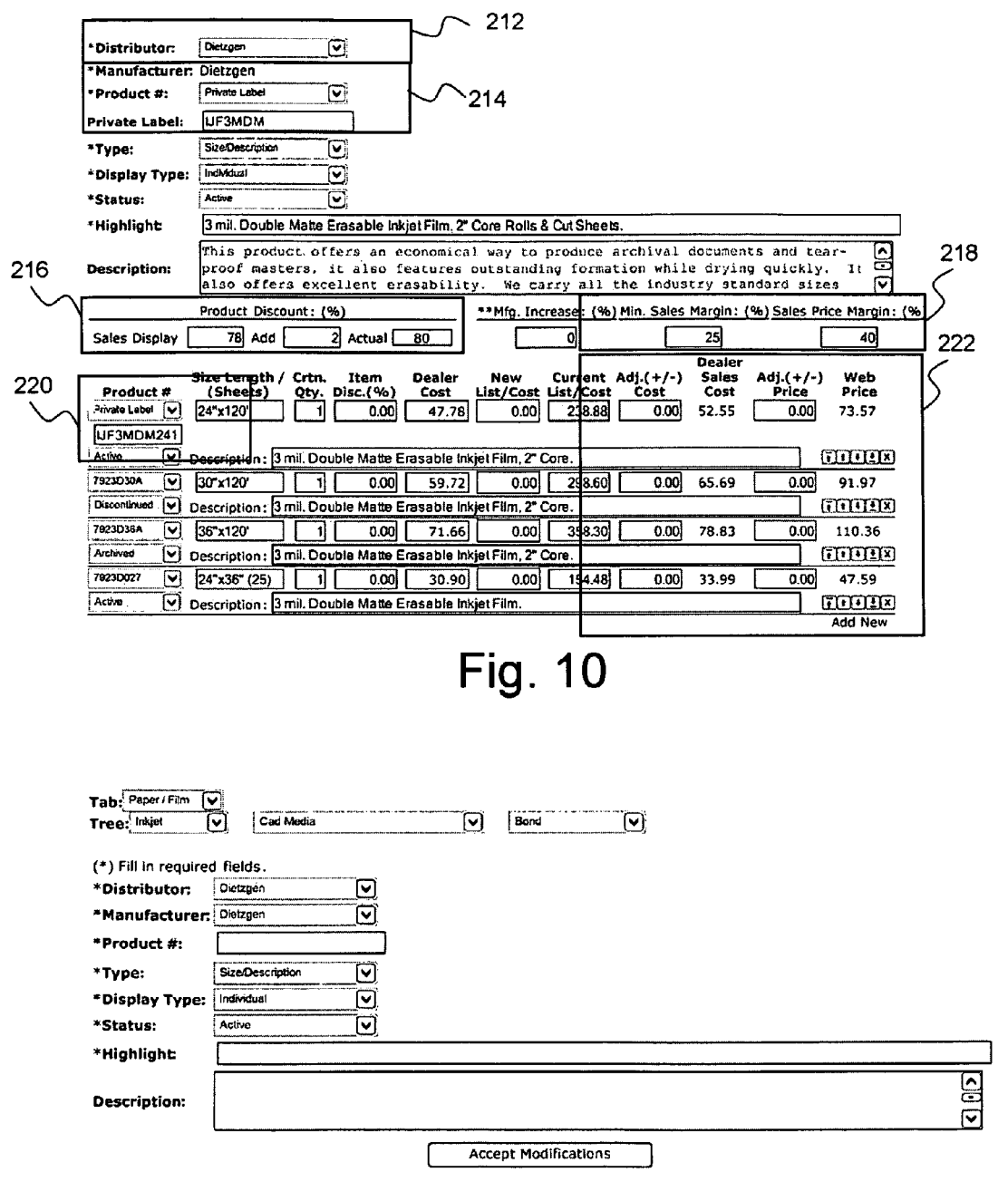

With reference to FIG. 11, an exemplary screen shot illustrates the template that is provided when the dealer 150 selects an [Add New] command. In the exemplary template, the dealer 150 chose the [Add_New] command under the tree location of Inkjet, Cad Media, Film. By doing this, the new product will be placed at this location in the tree by default, unless otherwise moved by the dealer. At any time during the creation of this product the dealer may be able to relocate the product, e.g., by selecting the drop downs of the tab and the tree.

The Distributor and the Manufacturer will default to the Vendor selected at the beginning of the Add New command. At any time the dealer can change the distributor and manufacturer, e.g., before selecting the "Save Product" command. Once the product is saved, the application may not allow the manufacturer to be changed. However, the application may allow the distributor to be changed after the product is saved, e.g., by utilizing the Modify command.

The Product # is the manufacturer's number and may be linked to the manufacturer when creating purchase orders. Private labeling this number is done in the Modify command as described in greater detail herein. The Type is the template used for the display of the product. These templates may be the same or similar to the exemplary templates that are described in greater detail herein with reference to FIG. 7.

The Status of the item may default to active status. However, in the illustrative example, there are four options for this product, including Active, Discontinued, Archive and New. The status attributes are analogous to the status attributes described with reference to boxes 202 and 208 of FIG. 6. The Highlight option is a brief description of the product. This is the description of the product number that may be highlighted when the user drags the cursor over the product before selecting it. The Description is the manufacturer's description of the product. This is viewed when the user selects the product. The "Save Product" command will save the product with all the inputs selected and bring up the template to add the items for the product.

With reference to FIG. 12, once the product has been saved and the template type that has been selected, a dialog box may be generated below the product creation information for product item input. Moreover, the cost information, examples of which are shown in the template of FIG. 12, may be entered by the dealer 150, allowing for complete price control of all the items attached to the product.

Once all of the product items have been entered and manipulated the dealer 150 may be required to accept the modifications, e.g., using a suitable "Accept Modifications" command button at the bottom of the screen. Once this is done, any further modification to the product may need to be performed, for example, in the Modify Product command.

A dealer may utilize the "Modify" option shown in FIG. 5 to modify any and all aspects of previously created products and the items associated with it. The dealer 150 selects the product in the same manner as adding a new product. Keeping with the same examples as above, when selecting the command, the dealer 150 may be presented, for example, with a list of vendors to select among for editing.

Assume that the dealer 150 selected a product from a predetermined manufacturer. The dealer 150 opens the tree to reveal the products that have been entered for the predetermined manufacturer. According to an aspect of the present invention, only product from one manufacturer may be displayed at any given time. All products may be displayed for the chosen manufacturer, even though the dealer may have previously toggled the display of such products or product items off, e.g., in the Display/Edit option. If the product has been indicated as discontinued it may be suitably distinguished, e.g., by having a label such as (disc), in red, behind the product number. If the product has been private labeled, it may show the private label, not the manufacturer's label. If the product has been archived it may be suitably distinguished, e.g., by having a label such as (arch), in green, behind the product number. If the product has been labeled as a new product it may also be suitably distinguished, e.g., by having a label such as (New), in bold, behind the product number, which will also be in bold lettering.

According to an aspect of the present invention, to select a product to modify and edit, the dealer 150 may place a cursor over the product number and click on it. The selected product will display with all its data as illustrated in the exemplary screen shot shown in FIG. 13. For purposes of illustration, the product shown was selected from the tree Inkjet, Cad Media, Film and the product 7923D.

The "Tab" field is the tab that the selected product is currently under. Changing the value of the Tab field will change the tree for that particular tab. This command allows the dealer to move product from one tab to another.

The "Tree" field is the tree of the specific product selected. It is editable, for example, from left to right. The dealer 150 can move product from one location to another if so desired.

The "Distributor" field is the supplier of the product, e.g., from whom the dealer is purchasing the product or product item from. According to an aspect of the present invention, the distributor must be in the vendor file, as described in greater detail herein. This is also the supplier used when creating a purchase order for the product selected. In many cases, the Distributor and the Manufacturer are one in the same.

The "Manufacturer" field will default to the manufacturer selected at the beginning of the command. According to an aspect of the present invention, it is only when the dealer creates a new product, under the "Add New" command, that the dealer may be able to select the manufacturer.

The "Product #" field may be defaulted to the manufacturers' product number. Once the dealer has created a product number, it generally should not be changed. The product can be private labeled as described more fully herein, such as by selecting the down arrow and by typing in the name.

The "Type" field is the template used for the product selected. The templates may be similar to, or at least analogous to the templates described more fully herein with reference to FIG. 7. The "Status" field shows the status of the product selected. As noted in greater detail herein, according to aspects of the present invention, four illustrative options may include Active, Discontinued, Archived and New and these status values are the same as the status values previously described herein.

The "Highlight" field is a brief description of the product selected. This description is displayed when the cursor is placed over the item number when selecting a product to display as described in greater detail herein.

The "Description" field is the manufacturers' description of the product as described in greater detail herein. The dealer may edit this field to customize or tailor the description.

The "Product Discount" field includes two fields in the exemplary implementation, including a Sales Display field and an Add field. These fields and corresponding discounting methods are substantially as set out above with reference to box 216 in FIG. 10.

The "Manufacturer Increase" field may be used by the dealer 150 to designate price increases. When the dealer 150 keys in an increase, e.g., of a certain percentage, the "New List/Cost" field next to each item will take that percentage keyed in and increase the items by that percentage using the existing list or cost price. The dealer 150 will still be able to edit any of the item new list prices by just keying in that price. In some cases the list price for some of the items may actually decrease.

The "Minimum Sales Margin" field may be used to set the minimum margin the dealer 150 will sell this product to a corresponding customer. The sales force may not be able to quote any of the items, e.g., without the approval of the administrator, below the minimum sales margin, which may be based on the dealers' sales cost, as noted in greater detail herein.

The "Sales Price Margin" field may be filled in by the dealer 150 with the appropriate markup desired to be made on this product. This is also the markup used from the dealer sales cost. The markup from the dealer cost may then be used, for example, to generate the web price.

The "Product #" field is the manufacturers' number as described in greater detail herein. If the dealer 150 chooses to private label the item he will just need to select the down arrow and type in the product number in the box provided. This number will now be displayed in lieu of the manufacturers' number. The manufacturers' number will always be available to reselect.

The product descriptions may vary depending upon the business of the various manufacturers 152 and dealers 150. However, keeping with the example of the paper products industry, the "Size Length/(Sheets)" field may be utilized to show the size and quantities of each item listed. The "Carton Qty." field may be used to define the quantity or units of measure each item is sold at. The "Item Discount %" field may be used to allow the dealer to add an additional percentage off of the list/cost of an individual item as described in greater detail herein, e.g., with regard to the box designated 210 in FIG. 6.

The "Dealer Cost" field may be displayed as the actual cost to the dealer 150. The cost comes, for example, from taking the current list/cost of the item, multiplied by the reciprocal of the actual discount plus any additional per item discounts.

The "New List/Cost" field may be keyed in individually for each item, showing the new list price of that item, or by keying in the manufacturers' percentage increase. This will take the current list price, multiplied by the percentage increase, and display the results in the red box next to each item. If performed, the dealer 150 will still be able to key in over the price for any item with a new price.

The "Current List/Cost" field may be used to define the current list or cost of the item. Changing this number will change all the fields accordingly including the web price and customers' homepage pricing.

The "Adjusted (+/−) Cost" field may allow the dealer 150 to adjust sales cost to compensate for additional expenses, like shipping, for this item. The "Adjusted (+/−) Price" field may allow the dealer 150 to put in an adjusted price for any item where the dealer 150 would like to make more or less of a margin. The "Web Price" field is the price that may be displayed on a web page for the item selected. This price is independent of the price that the dealer 150 may enter on the customers' homepage. The dealer 150 can insert any price when adding or editing it to the customers' homepage. In this regard, the customer homepage is affected only when the dealer 150 updates the list price.

The "Description" field is filled in accordingly for the item. With regard to the Layout Boxes, all the headings may be manipulated to the liking of the dealer 150. The layout boxes with the arrows in it may allow the headings to be moved in the order that the dealer 150 wants them to appear on their website. For example, in the exemplary implementation, the first button moves the heading to the top (Arrow up w/ a line above it). The second button moves the heading up one (Arrow up). The third button moves the heading down one (Arrow down). The forth button moves the heading to the bottom (Arrow down w/ a line under it). The fifth button, with the X in it, deletes the heading.

The "Add New" option located at the end of all the items below the layout boxes, will add another item to the list of items already listed.

An "Accept Modifications" command may be used when any modifications are made to the data. If implemented, the dealer may select this command to save any changes that have been made in the exemplary implementation. A "Clear All New List Price Increases back to $0.00" command may also be provided, which takes all the numbers in the Manufacturing Increases and New List/Cost boxes next to each item back to $0.00, including the discount from the manufacturer.

An "Update New Price Increases" command may be used, for example, to apply the price increase to the current price/cost of the item and set the new list/cost price back to $0.00. This increase will affect the web display and the customers' homepage.

Referring back to FIG. 5, the "Display/Edit" option provides a section of the application that allows the dealer 150 to pick and choose which products from which manufacturers to be displayed on the dealer website. Such an option along with the modify product command, may offer the dealer 150 complete control over their website. When selecting this command, the dealer 150 may display the manufacturers from the tab that is highlighted. For example, a window may display a listing of manufacturers. A control may be provided to select/turn on or unselect/turn off the display of each manufacturer. Further, a control may be provided to include "all manufacturers". The window may also allow the dealer 150 to select a manufacturer to expand a listing of products of that manufacturer for viewing and/or editing. If the dealer 150 turns on the "all manufacturers" control, the products from all of the manufacturers may be viewed/edited at the same time. As an illustrative example, all the products that are turned "on" from all the manufacturers that are themselves turned "on" may be displayed for viewing/editing. This feature may also allow the dealer to combine multiple products from multiple manufacturers' under one category. When the "all manufacturers" selection is turned off, then the dealer can view/edit the products of each manufacturer individually.

On and Off or similar controls may allow the dealer 150 to turn each manufacturer on or off. If a specific manufacturer is turned off, the dealer 150 will not be able to display any of the products of that manufacturer on their website. However, the dealer 150 may be able to Modify/Edit any of the manufacturers' products, even if turned off. Other techniques may alternatively be utilized to control the display of manufacturers.

With reference to FIG. 14, as an illustrative example, with All Manufacturers "On", the control may go directly to the product tree without displaying any of the manufacturers. With reference to FIG. 15, with All Manufacturers "Off", control may go through the manufacturer first to get to the tree, and only the products of the manufacturer chosen may be displayed.

For example, the screen may display a "Click Here to Display/Edit Products" command for each manufacturer. When actuated from one of the list of manufacturers, the control may cause the application to open, for example, the tree for that specific manufacturer. By opening up the tree, the dealer may gain visibility of the product level. As an illustrative example, to open up the tree, to display all the products, the dealer may select the tree heading.

In the exemplary implementation, when the command is selected, there are "On" and "Off" controls for every level of the tree. This will allow the dealer 150 to turn off any of the product groups that the dealer does not want displayed on the dealer website. The on and off buttons are considered hierarchy commands. For example, if the dealer 150 chooses not to display any of the inkjet products for the manufacturer chosen, the off button next to inkjet may be selected and the entire tree category below it may be turned off even if the categories below it are turned on. If the dealer 150 wants to display only the select products, the dealer 150 need only to turn on the desired products to be offered for sale, and turn off the products that are not to be offered for sale. This may be accomplished at for the overall dealer system or individually for specific customers that have their own home page.

With reference to FIG. 16, a screen display provides an exemplary illustration of a view of product information. The exemplary view assumes that a product e.g., product 7923D was selected for viewing. Under this arrangement, the options that the dealer 150 may select and/or control can vary, depending for example, upon the type of product. As an example, the dealer 150 may be able to control whether or not to display this product, and what items under that product the dealer wants to display.

The "Display On or Off" commands may be used, for example, to allow the dealer to turn the entire product on or off so it will or will not display on the dealer website. If a product is turned off, it may display, such as in a half tone on the list of manufacturers products when the products of the manufacturer are first displayed.

If the dealer has a list of two or more items in a specific category, the dealer may only want to display a few of the items and turn the other items off without having to turn the entire tree level off. In this regard, the tree levels need to be turned on if the dealer wants any product to display on the website.

In the exemplary implementation, the Display P, S, Off commands allows the dealer 150 to have the option to display any or all items from the list of this product type. In an illustrative example, there are 3 options, including Primary (P), Secondary (S) or Off. All items having the P command selected may be displayed when the customer selects this product from the dealer webpage/customer homepage. The primary items are the ones that the dealer 150 usually inventories and are the most frequently ordered items. This is mainly used to keep the list from being to large when displayed on the web, an example of which is shown in FIG. 17. Items having the S (Secondary) command selected may be displayed when the user selects the option, "Click here to display additional sizes and configurations of this product" (not shown). Similarly, items having the S (Secondary) command selected may be concealed, such as when the user clicks on the "Click here to hide additional sizes and configurations of this product", as shown in the exemplary screen shot. These secondary items are usually the ones that are not inventoried but can be ordered in a timely manner, or even dropped shipped. The Off button will not display the item at all on the website.

Participating Dealers Customers:

According to various aspects of the present invention, the dealer controls the display of each customer's homepage, if such a homepage is provided to that particular dealer's customer. The dealer 150 may be able to add and delete product from the customers homepage as well as control pricing for each individual customer. Individual customer notes can be added to any customer as well as a global note to all customers, e.g., using a message center to direct the messages. Specials can also be added for all customers to view.

Customer Homepages:

Referring to FIG. 18, the dealer 150 may use the application 120 to create customized homepages for select customers. In this regard, the dealer 150 may first be required to create a customer account, such as by using the Add New command that interacts with the customer component 124. The homepage may consist, for example, of previously and/or frequently ordered items, etc. In general, the customer homepages can be custom tailored to the specific desires and/or needs of the customer, e.g., using the website builder component 132 of the application 120. The dealer 150 has complete control over what items are displayed and the price of those displayed items. The exemplary screen shot illustrates an example showing an initial screen of a new or existing customer (no product added).

Referring to FIG. 19, an exemplary screen shot illustrates adding product, e.g., film to a customer homepage. In the illustrative example, the dealer 150 may select product from any manufacturer even if the manufacturer's products are turned off and not displayed on the website. This feature allows, for example, the dealer 150 to sell certain items to a few customers but not letting others know that the dealer have it available.

Now that the dealer 150 has the customers homepage displayed, product can be added thereto. As an example, in the lower right portion of the illustrative screen shot, an Add New command is available By selecting this command, the dealer 150 is brought to the product screen where product selections can be made.

Referring to FIG. 20, once the product is displayed, the dealer 150 may click on the Add button at the end of each item. If the dealer 150 wants to add more items, the dealer 150 may simply select another product as in the previous example. Once the dealer 150 chooses the items, the Add button will disappear because these items are now on the customer's homepage. If the dealer 150 were to select any other products items, and the Add button is not displayed, it means that the item is already on the selected customers' home page.

Referring to FIG. 21, the dealer 150 may also set margin, customer price and/or other attributes. The margin may comprise, for example, the margin that was keyed in at the dealer-side/menus, e.g., as described with reference to the Product Modify command. The dealer 150 can change (at any time) either the customer price or key in a new margin. A change to the margin will automatically change the customer price and vice versa. If a minimum markup was keyed-in in the Product Modify command, e.g., 20%, then no matter how low the dealer tries to key in a number less than the 20% it will not display it, but will display the 20%. Also, in the example, a miscellaneous item was also added (see line item 3) by selecting the Add/Misc. command. This feature allows the dealer to select items that are not in the dealer product list. These items are not attached to any data base and therefore will not automatically increase in price when there is a price increase from the manufacturer.

When the dealer 150 first adds items to the customer's homepage, the dealer 150 does not want to display the newly added items until the dealer 150 has edited the price. As such, a control may be provided, e.g., a checkbox or authorization prompt may be provided to turn the new item(s) on for the customer to view on their customized homepage. Once the dealer 150 has made all the dealer modifications to the list of products the dealer need only select an "Accept Modifications" or other suitable command.

The Layout Box options may comprise the same boxes as were described with reference to the Modify Product commands. The layout box options allow the dealer to display product in any order as well as delete a product from the customer home page.

A "Specials" command may also be provided, which acts the same way as an individual customer homepage, except the product(s) in the specials homepage may be viewable for all or a designated subset of the dealer customers.

With reference to FIGS. 22-24, the application 120, 154 may support messaging in both a global manner, e.g., dealer to all customers, etc. Also, targeted messaging may be implemented. For example, a dealer can target a specific customer for particular messages.

As shown in the exemplary screen shots, a Notes command allows the dealer 150 to place either a global note to all the dealer customers or individual notes for one or more customers. In an illustrative implementation, when the dealer 150 first selects the customer command, the company name will display (select company). When the note option is selected, with the customer being (select company), the dealer may place a global note to all the dealer customers, which will appear on the corresponding homepage of each customer. This same command will also have an option to place a global note for the dealer specials homepage. If there is no information in the notes, then the note headings will not display on the customers' homepage or the customers' special page. In like manner when the dealer 150 select a company from the pull down menu and then selects the note command, the dealer may place a note on that customers' homepage. In the same manner if the dealer 150 has no information on the customers note, then the note heading will not display on the customer's homepage.

With reference to FIG. 25, a screen shot illustrates a portion of the screen actually seen by the customer, e.g., when the customer uses a web browser to log into their homepage. As shown, global messages as well as personal messages are displayed, if messages are waiting. Moreover, the customer can easily purchase from the available items, see their cost for those items, etc. Moreover, if the customer wants to evaluate or purchase products that are not on their webpage, they can navigate to the dealer web page and see other product options. As illustrated, certain information displayed on the customer homepage, e.g., description, etc., may be directly passed through from a participating manufacturer such that the dealer does not need to re-enter or redo work already performed by the corresponding participating manufacturer.

Figure 26:
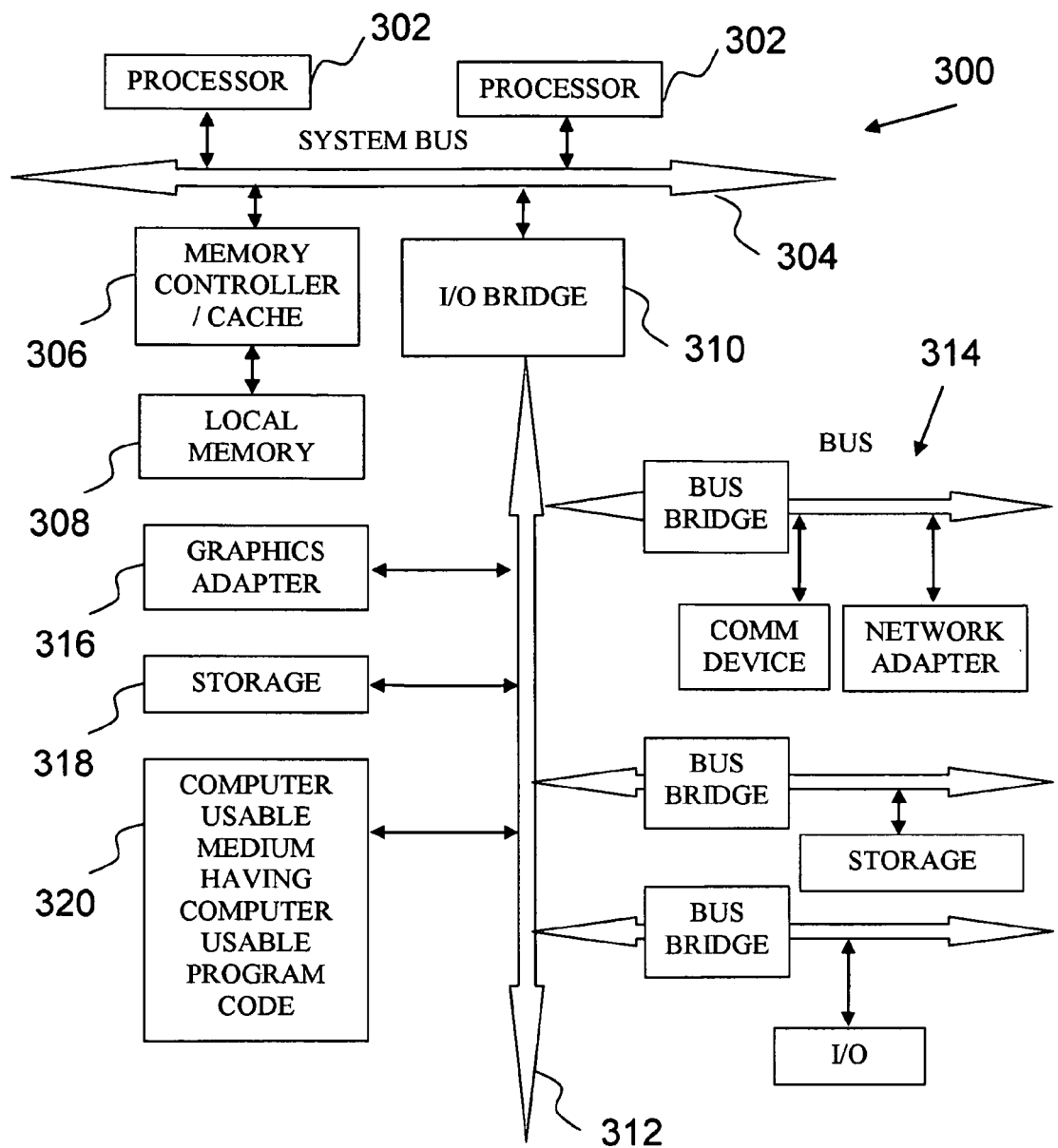
FIG. 26 is a block diagram of an exemplary computer system including a computer usable medium having computer usable program code embodied therewith, where the exemplary computer system is capable of executing a computer program product to implement one or more aspects of product building and display and/or e-commerce according to various aspects of the present invention set out more fully herein.

Referring to FIG. 26, a block diagram of a data processing system is depicted in accordance with the present invention. A data processing system 300, such as may be utilized to implement the hierarchical teleconference controller, may comprise a symmetric multiprocessor (SMP) system or other configuration including a plurality of processors 302 connected to system bus 304. Alternatively, a single processor 302 may be employed. Also connected to system bus 304 is memory controller/cache 406, which provides an interface to local memory 308. An I/O bridge 310 is connected to the system bus 304 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to execute any aspect of the present invention, for example, to implement aspect of any of the methods, computer applications and/or system components illustrated in FIGS. 1-25.

The various aspects of the present invention may be embodied as systems, computer-implemented methods and computer program products. Also, various aspects of the present invention may take the form of an embodiment combining software and hardware, wherein the embodiment or aspects thereof may be generally referred to as a "component", "module" or "system."

Furthermore, the various aspects of the present invention may take the form of a computer program product on a computer-usable storage medium having computer-usable program code embodied in the medium. In this regard, the software aspects of the present invention may be stored, implemented and/or distributed on any suitable computer usable or computer readable medium(s), including but not limited to, any medium that can contain or store the program for use by or in connection with an instruction execution system of a corresponding processing device. The computer program product aspects of the present invention may be stored together or distributed, either spatially or temporally across one or more devices.

A computer-usable or computer-readable medium may comprise, for example, an electronic, magnetic, optical, electromagnetic, infrared, or semiconductor system, apparatus or device. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself. As such, any physical memory associated with part of a network or network component can constitute a computer readable medium.

Computer program code for carrying out operations of the present invention may be written in any suitable language. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to block diagrams to illustrate methods, apparatus systems and computer program products according to various aspects of the invention. It will be understood that each block and combinations of blocks in the illustrations may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The block diagrams in the Figures illustrate the architecture, functionality, and operation of possible implementations of systems, methods and computer program products according to various aspects of the present invention. In this regard, one or more blocks may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A non-transitory computer-readable storage medium with an executable program stored thereon, the program for implementing a dealer application that assists a dealer in selling a manufacturer's products to the dealer's customers, wherein the program comprises instructions for a microprocessor to implement:

a products component that is:
  utilized by the dealer to perform at least one of: entering product information and managing product information, related to manufacturer products carried by the dealer; and
  utilized by a manufacturer through an interface component to communicate product information to the products component, wherein:
    the manufacturer has control over at least one predetermined product data attribute of the communicated product information that the dealer cannot change from within the application;

a customer component that is utilized by the dealer to perform at least one of: entering customer information and managing customer information, about the customers that purchase from the dealer;

a vendor component that is utilized by the dealer to perform at least one of: entering information and managing information, about manufacturers of products sold by the dealer;

a web site builder component that utilizes information stored by the product component and the customer component to generate and deploy a customized homepage for at least one customer such that:
  the dealer controls the products displayed on the customized homepage; and
  customer pricing on the customer's homepage is computed based upon the dealer cost and a margin set by the dealer, wherein the margin is customized for the associated customer.

2. The computer-readable storage medium according to claim 1, wherein the interface component is further used by manufacturers to log into the application and navigate to the products component for creation and/or modification of product attributes of the manufacturer's products offered for sale by the dealer application.

3. The computer-readable storage medium according to claim 1, wherein the program further comprises instructions for a microprocessor to implement:

a first display attribute associated with each of the manufacturer's products within the dealer application that is toggled on or off by the manufacturer so that the associated dealer has visibility of only select manufacturer products within the application; and a second display attribute associated with each of the products made visible to the dealer by the manufacturer, that is toggled on or off to limit or otherwise select out a limited number of manufacturer products available to the dealer, which are offered by the dealer to a select customer homepage.

4. The computer-readable storage medium according to claim 3, further comprising instructions to designate products for display on a customer homepage as primary, in which the primary designated products are visible on the homepage in a default view, and secondary, in which the secondary designated products may be selectively hidden or revealed by the customer while accessing their custom homepage.

5. The computer-readable storage medium according to claim 1, wherein the products component is further utilized to:

provide a new list/cost field that is available only to the dealer that temporarily stores an adjustment to dealer cost, wherein:
  the new list cost field stores the new updated value until a triggering event causes the updated value entered into the new list/cost field to replace a current list/cost field.

6. The computer-readable storage medium according to claim 1, further comprising instructions to divide dealer cost into a first component and a second component, wherein the value of the first component corresponds to a sales display value that is visible to sales force and employees of the associated dealer as a discount off of list for setting web based pricing to customers and the second component designates an amount that the associated dealer wants to hold back such that discounts provided to the dealer from the manufacturer may be entered without affecting the computation of web-based pricing displayed on the homepages of the dealer's customers.

7. The computer-readable storage medium according to claim 1, wherein the instructions to implement the products component is further utilized to compute a dealer cost field by multiplying a current list/cost by the reciprocal of an actual discount plus any additional per item discounts.

8. The computer-readable storage medium according to claim 1, wherein the instructions to implement the product component further include a plurality of templates that facilitate setting up the identification of products that are available to each customer of the dealer on each customer's home page, wherein the templates are available for use by participating manufacturers that are logged into the application and the templates are available to the dealer for setting up products for non-participating manufacturers.

9. The computer-readable storage medium according to claim 1, wherein the instructions to implement the product component further comprise instructions that are utilized by the dealer to add a private label to products the dealer sells and may chose to display the private label on the dealer's customer homepages, wherein the application is further configured such that the dealer cannot change a manufacturer product number within the application.

10. The computer-readable storage medium according to claim 1, further comprising instructions to implement an administrative component that facilitates a messaging system that allows the dealer to communicate private messages to corresponding customers via the customized homepage of corresponding customers.

11. A method for assisting a dealer in selling a manufacturer's products to the dealer's customers, comprising:
  providing a dealer application executing on a server computer, which is configured to integrate interaction of a dealer with at least one manufacturer and to integrate interaction of the dealer with at least one customer by:
    providing a products component that is:
      utilized by the dealer to perform at least one of: entering product information and managing product information, related to manufacturer products carried by the dealer; and
      utilized by a manufacturer through an interface component to communicate product information to the products component, wherein:
        the manufacturer has control over at least one predetermined product data attribute of the communicated product information that the dealer cannot change from within the application;
    providing a customer component that is utilized by the dealer to perform at least one of: entering customer information and managing customer information, about the customers that purchase from the dealer; and
    providing a vendor component that is utilized by the dealer to perform at least one of: entering information and managing information, about manufacturers of products sold by the dealer; and
  utilizing the server computer to execute a web site builder component that utilizes information stored by the product component and the customer component to automatically generate and deploy a customized homepage for at least one customer such that:
    the dealer controls the products displayed on the customized homepage; and
    customer pricing on the customer's homepage is computed based upon dealer cost and a margin set by the dealer, wherein the margin is customized for the associated customer.

12. The method according to claim 11, further comprising enabling participating manufacturers to log directly into the application and navigate to the products component for creation and/or modification of product attributes of the manufacturer's products offered for sale by the dealer application.

13. The method according to claim 11, further comprising:
  enabling participating manufacturers to toggle a first display attribute of each of the manufacturer's products within the dealer application on or off so that the associated dealer has visibility of only select manufacturer products within the application; and
  enabling the dealer to toggle a second display attribute on or off to limit or otherwise select out a limited number of manufacturer products that are toggled on by the manufacturer, to generate the customized homepages for the customers of the dealer.

14. The method according to claim 13, further comprising designating products for display on a customer homepage as primary, in which the primary designated products are visible on the homepage in a default view, and secondary, in which the secondary designated products may be selectively hidden or revealed by the customer while accessing their custom homepage.

15. The method according to claim 11, further comprising:
  providing a new list/cost field that is available only to the dealer that temporarily stores an adjustment to dealer cost; and
  storing the new updated value until a triggering event is detected that causes the updated value entered into the new list/cost field to replace a current list/cost field.

16. The method according to claim 11, further comprising:
  computing a dealer cost field for each product offered by a dealer webpage or customer homepage by multiplying a current list/cost by the reciprocal of an actual discount plus any additional per item discounts.

17. The method according to claim 11, further comprising:
  configuring a plurality of templates that facilitate setting up the identification of products that are available to each customer of the dealer on each customer's home page, wherein the templates are available for use by participating manufacturers that are logged into the application and the templates are available to the dealer for setting up products for non-participating manufacturers.

18. The method according to claim 11, further comprising dividing dealer cost into a first component and a second component, wherein the value of the first component corresponds to a sales display value that is visible to sales force and employees of the associated dealer as a discount off of list for setting web based pricing to customers and the second component designates an amount that the associated dealer wants to hold back such that discounts provided to the dealer from the manufacturer may be entered without affecting the computation of web-based pricing displayed on the homepages of the dealer's customers.

19. The method according to claim 11, further comprising configuring the product component such that the dealer can add a private label to products it sells and may chose to display the private label on their customer homepages, wherein the application is further configured such that the dealer cannot change a manufacturer product number within the application.

20. The method according to claim 11, further comprising implementing an administrative component that facilitates a messaging system that allows the dealer to communicate private messages to corresponding customers via the customized homepage of corresponding customers.

* * * * *